US009552901B2

(12) United States Patent
Amiruddin et al.

(10) Patent No.: US 9,552,901 B2
(45) Date of Patent: Jan. 24, 2017

(54) LITHIUM ION BATTERIES WITH HIGH ENERGY DENSITY, EXCELLENT CYCLING CAPABILITY AND LOW INTERNAL IMPEDANCE

(75) Inventors: Shabab Amiruddin, Menlo Park, CA (US); Subramanian Venkatachalam, Pleasanton, CA (US); Bing Li, Union City, CA (US); Charles Bowling, Palo Alto, CA (US); Yezi Bei, Fremont, CA (US); Deepak Kumaar Karthikeyan, Foster City, CA (US); Herman Lopez, Sunnyvale, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 958 days.

(21) Appl. No.: 13/588,783

(22) Filed: Aug. 17, 2012

(65) Prior Publication Data

US 2014/0050972 A1    Feb. 20, 2014

(51) Int. Cl.
*H01M 4/13* (2010.01)
*H01M 4/58* (2010.01)
(Continued)

(52) U.S. Cl.
CPC ............ *H01B 1/08* (2013.01); *C01G 53/50* (2013.01); *H01M 4/131* (2013.01); *H01M 4/505* (2013.01);
(Continued)

(58) Field of Classification Search
USPC .............. 429/218.1, 223, 224, 231.95, 162
(Continued)

(56) References Cited

U.S. PATENT DOCUMENTS 5,429,890 A *  7/1995  Pynenburg et al. .......... 429/310
5,658,693 A     8/1997  Thackeray et al.
(Continued)

FOREIGN PATENT DOCUMENTS

CN      102473957 A      5/2012
EP      2264814 A1      12/2010
(Continued)

OTHER PUBLICATIONS

Taiwan Office Action from corresponding Taiwan Patent Application No. 102129556 (9 pages), dated Sep. 10, 2014.
(Continued)

*Primary Examiner* — Patrick Ryan
*Assistant Examiner* — Julian Anthony
(74) *Attorney, Agent, or Firm* — Dardi & Herbert, PLLC; Peter S. Dardi

(57) ABSTRACT

Batteries with particularly high energy capacity and low internal impedance have been described herein. The batteries can exhibit extraordinary long cycling with acceptable low amounts of fade. Pouch batteries using high specific capacity lithium rich metal oxide as positive electrode material combined with graphitic carbon anode can reach an energy density of at least about 180 Wh/kg at a rate of C/3 from 4.35V to 2V at room temperature while having a room temperature areas specific DC resistance of no more than about 75 ohms-cm$^2$ at 20% SOC based on a full charge to 4.35V. High specific capacity lithium rich metal oxide with specific stoichiometry ranges used in these batteries are disclosed.

32 Claims, 17 Drawing Sheets

(51) Int. Cl.
*H01M 6/12* (2006.01)
*H01M 6/46* (2006.01)
*H01M 4/00* (2006.01)
*H01B 1/08* (2006.01)
*H01M 4/505* (2010.01)
*H01M 4/131* (2010.01)
*H01M 10/0525* (2010.01)
*C01G 53/00* (2006.01)
*H01M 2/02* (2006.01)

(52) U.S. Cl.
CPC ...... *H01M 10/0525* (2013.01); *C01P 2002/52* (2013.01); *C01P 2006/40* (2013.01); *H01M 2/021* (2013.01); *Y02E 60/122* (2013.01); *Y02T 10/7011* (2013.01)

(58) Field of Classification Search
IPC .................. H01M 4/13, 4/131, 4/525, 4/50, 4/52
See application file for complete search history.

(56) References Cited

U.S. PATENT DOCUMENTS

| | | | |
|---|---|---|---|
| 5,674,645 A | 10/1997 | Amatucci et al. | |
| 6,037,095 A | 3/2000 | Miyasaka | |
| 6,087,042 A | 7/2000 | Sugiyama et al. | |
| 6,168,887 B1 | 1/2001 | Dahn et al. | |
| 6,183,718 B1 | 2/2001 | Barker et al. | |
| 6,248,477 B1 | 6/2001 | Howard, Jr. et al. | |
| 6,251,822 B1 | 6/2001 | Peng et al. | |
| 6,287,721 B1* | 9/2001 | Xie et al. ................... | 429/152 |
| 6,322,744 B1 | 11/2001 | Kelley et al. | |
| 6,372,385 B1 | 4/2002 | Kweon et al. | |
| 6,420,071 B1 | 7/2002 | Lee et al. | |
| 6,428,766 B1 | 8/2002 | Fujino et al. | |
| 6,489,060 B1 | 12/2002 | Zhang et al. | |
| 6,589,499 B2 | 7/2003 | Gao et al. | |
| 6,596,435 B2 | 7/2003 | Kelley et al. | |
| 6,660,432 B2 | 12/2003 | Paulsen et al. | |
| 6,677,082 B2 | 1/2004 | Thackeray et al. | |
| 6,680,143 B2 | 1/2004 | Thackeray et al. | |
| 6,749,648 B1 | 6/2004 | Kumar et al. | |
| 6,872,491 B2 | 3/2005 | Kanai et al. | |
| 6,964,828 B2 | 11/2005 | Lu et al. | |
| 7,078,128 B2 | 7/2006 | Lu et al. | |
| 7,135,252 B2 | 11/2006 | Thackeray et al. | |
| 7,205,072 B2 | 4/2007 | Kang et al. | |
| 7,285,357 B2 | 10/2007 | Jordy et al. | |
| 7,364,793 B2 | 4/2008 | Paulsen et al. | |
| 7,368,071 B2 | 5/2008 | Dahn et al. | |
| 7,393,476 B2 | 7/2008 | Shiozaki et al. | |
| 7,435,402 B2 | 10/2008 | Kang et al. | |
| 7,452,631 B2 | 11/2008 | Kitao et al. | |
| 7,468,223 B2 | 12/2008 | Thackeray et al. | |
| 7,517,613 B2 | 4/2009 | Yuasa et al. | |
| 7,575,830 B2* | 8/2009 | Kawamura ............ | H01M 4/134 |
| | | | 252/521.3 |
| 7,674,557 B2 | 3/2010 | Sun et al. | |
| 8,187,752 B2 | 5/2012 | Buckley et al. | |
| 8,609,284 B2* | 12/2013 | Kepler et al. ............ | 429/231.95 |
| 2002/0055042 A1 | 5/2002 | Kweon et al. | |
| 2002/0114995 A1 | 8/2002 | Thackeray et al. | |
| 2003/0082448 A1 | 5/2003 | Cho et al. | |
| 2003/0087155 A1 | 5/2003 | Cho et al. | |
| 2003/0108790 A1 | 6/2003 | Manthiram et al. | |
| 2004/0076884 A1 | 4/2004 | Lee et al. | |
| 2004/0091779 A1 | 5/2004 | Kang et al. | |
| 2004/0234857 A1 | 11/2004 | Shiozaki et al. | |
| 2005/0031942 A1 | 2/2005 | Hennige et al. | |
| 2005/0058588 A1 | 3/2005 | Kang et al. | |
| 2005/0202316 A1 | 9/2005 | Hwang et al. | |
| 2005/0220700 A1 | 10/2005 | Suhara et al. | |
| 2006/0051671 A1 | 3/2006 | Thackeray et al. | |
| 2006/0051673 A1 | 3/2006 | Johnson et al. | |
| 2006/0083991 A1 | 4/2006 | Ahn et al. | |
| 2006/0147809 A1 | 7/2006 | Amine et al. | |
| 2006/0188781 A1 | 8/2006 | Thackeray et al. | |
| 2006/0257743 A1 | 11/2006 | Kuratomi et al. | |
| 2006/0275667 A1 | 12/2006 | Watanabe et al. | |
| 2007/0072080 A1 | 3/2007 | Inagaki et al. | |
| 2007/0111098 A1 | 5/2007 | Yang Kook et al. | |
| 2007/0122703 A1 | 5/2007 | Whitfield et al. | |
| 2007/0160906 A1 | 7/2007 | Tooyama et al. | |
| 2007/0202405 A1 | 8/2007 | Shizuka et al. | |
| 2007/0212607 A1 | 9/2007 | Fujihara et al. | |
| 2007/0292757 A1 | 12/2007 | Watanabe et al. | |
| 2008/0102369 A1 | 5/2008 | Sakata et al. | |
| 2008/0107968 A1 | 5/2008 | Patoux et al. | |
| 2008/0118843 A1 | 5/2008 | Tarnopolsky | |
| 2008/0118847 A1 | 5/2008 | Jung et al. | |
| 2008/0135802 A1 | 6/2008 | Saito et al. | |
| 2008/0157027 A1 | 7/2008 | Manthiram et al. | |
| 2008/0193841 A1 | 8/2008 | Sun et al. | |
| 2008/0241693 A1 | 10/2008 | Fukuchi et al. | |
| 2008/0268347 A1 | 10/2008 | Ohzuku et al. | |
| 2009/0087362 A1 | 4/2009 | Sun et al. | |
| 2009/0127520 A1 | 5/2009 | Whitfield et al. | |
| 2009/0155694 A1 | 6/2009 | Park | |
| 2009/0297947 A1 | 12/2009 | Deng et al. | |
| 2009/0305131 A1 | 12/2009 | Kumar et al. | |
| 2010/0086853 A1 | 4/2010 | Venkatachalam et al. | |
| 2010/0086854 A1 | 4/2010 | Kumar et al. | |
| 2010/0104944 A1 | 4/2010 | Saito et al. | |
| 2010/0119942 A1 | 5/2010 | Kumar | |
| 2010/0151332 A1 | 6/2010 | Lopez et al. | |
| 2010/0227222 A1 | 9/2010 | Chang et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0111294 A1 | 5/2011 | Lopez et al. | |
| 2011/0111298 A1 | 5/2011 | Lopez et al. | |
| 2011/0136019 A1 | 6/2011 | Amiruddin et al. | |
| 2011/0236751 A1 | 9/2011 | Amiruddin et al. | |
| 2011/0244331 A1 | 10/2011 | Karthikeyan et al. | |
| 2012/0028105 A1 | 2/2012 | Kumar et al. | |
| 2012/0056590 A1 | 3/2012 | Amiruddin et al. | |
| 2012/0070725 A1 | 3/2012 | Venkatachalam et al. | |
| 2012/0070746 A1 | 3/2012 | Mikhaylik et al. | |
| 2012/0282521 A1 | 11/2012 | Choi et al. | |
| 2013/0043843 A1 | 2/2013 | Amiruddin et al. | |
| 2013/0157147 A1 | 6/2013 | Li et al. | |

FOREIGN PATENT DOCUMENTS

| | | |
|---|---|---|
| JP | 57065674 A2 | 4/1982 |
| JP | 06-243871 | 9/1994 |
| JP | 09-045373 | 2/1997 |
| JP | 10-255837 | 9/1998 |
| JP | 3112138 | 9/2000 |
| JP | 2001-052707 | 2/2001 |
| JP | 3276451 | 2/2002 |
| JP | 2002-110167 | 4/2002 |
| JP | 3506397 | 12/2003 |
| JP | 2006-134816 | 5/2006 |
| JP | 2006-344425 | 12/2006 |
| JP | 2007-220630 A | 8/2007 |
| JP | 2008-536285 | 9/2008 |
| JP | 2008-258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 B1 | 1/2008 |
| KR | 10-0822013 | 4/2008 |
| KR | 10-2008-0099132 A | 11/2008 |
| KR | 10-2009-0078128 A | 7/2009 |
| TW | 201225391 A1 | 6/2012 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2006/025707 A1 | 3/2006 |
| WO | 2006/109930 A1 | 10/2006 |

(56) References Cited

FOREIGN PATENT DOCUMENTS

| WO | 2006/137673 A1 | 12/2006 |
|---|---|---|
| WO | 2007-094645 | 8/2007 |
| WO | 2008/086041 A1 | 7/2008 |

OTHER PUBLICATIONS

Search Report and Written Opinion for corresponding International Patent Application No. PCT/US2013/053015 dated Oct. 24, 2013.
Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.
Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.
Aurbach et al., "On the capacity fading of LiCoO2 intercalation electrodes: the effect of cycling, storage, temperature, and surface film forming additives," Electrochimica Acta 47 (2002) 4291-4306.
Boulineau et al., "Reinvestigation of Li2MnO3 Structure: Electron Diffraction and High Resolution TEM," Chem. Mater. 2009, 21, 4216-4222.
Chen et al., "Studies of LiCoO2 Coated with Metal Oxides," Electrochemical and Solid State Letters, 6 (11) A221-A224 (2003).
Chen et al., "Effect of a ZrO2 Coating on the Structure and Electrochemistry of LixCoO2 When Cycled to 4.5 V," Electrochemical and Solid-State Letters , 5 (10) A213-A216 (2002).
Cho et al., "Comparison of Al2O3- and AlPO4-coated LiCoO2 cathode materials for a Li-ion cell," J. of Power Sources 146 (2005) 58-64.
Cho et al., "LiCoO2 Cathode Material That Does Not Show a Phase Transition from Hexagonal to Monoclinic Phase," J. of the Electrochemical Society, 148 (10) A1110-A1115 (2001).
Cho et al., "High-Performance ZrO2-Coated LiNiO2 Cathode Material," Electrochemical and Solid-State Letters, 4 (10) A159-A161 (2001).
Cho et al., "Zero-Strain Intercalation Cathode for Rechargeable Li-Ion Cell," Angew. Chem. Int. Ed. 2001, 40 (18):3367-3369.
Cho et al., "Novel LiCoO2 Cathode Material with Al2O3 Coating for a Li Ion Cell," Chem. Mater. 2000, 12 (12), 3788-3791.
Choi et al., "Superior Capacity Retention Spinel Oxyfluoride Cathodes for Lithium-Ion Batteries," Electrochemical and Solid-State Letters 9 (5) (2006) A245-A248.
Fey et al., "Enhanced cyclability of LiCoO2 cathodes coated with alumina drived from carboxylate-alumoxanes," J. of Applied Electrochemistry (2005) 35:177-184.
Fey et al., "Preformed boehmite nanoparticles as coating materials for long-cycling LiCoO2," J. of Applied Electrochemistry 34:715-722 (2004).
Fey et al., "A simple mechano-thermal coating process for improved lithium battery cathode materials," J. of Power Sources 132 (2004) 172-180.
Fey et al., "Saturated linear dicarboxylic acids as chelating agents for the sol-gel synthesis of LiNi0.8Co0.2O2," Materials Chemistry and Physics 87 (2004) 246-255.
Ho et al., "Application of A-C Techniques to the Study of Lithium Diffusion in Tungsten Trioxide Thin Films," J. Electrochem. Soc., 1980; 127(2):343-350.
Hong et al., "Structural evolution of layered Li1.2Ni0.2Mn0.6O2 upon electrochemical cycling in a Li rechargeable battery," J. Mater. Chem., 2010, 20, 10179-10186.
Hwang et al. "Influence of Mn content on the morphology and electrochemical performance of LiNi1-x-yCoxMnyO2 cathode materials," J. Mater. Chem., 2003; 13:1962-1968.
Ito et al., "The relationship between crystal structure and the electrochemical reaction of Li-rich insertion materials (2)" 2010.
Ito et al., "Cyclic deterioration and it's improvement for Li-rich layered cathode material Li[Ni0.17Li0.2Co0.07Mn0.56]O2," Journal of Power Sources, 195: 567-573 (2010).
Ito et al., "A new approach to improve the high-voltage cyclic performance of Li-rich layered cathode material by electrochemical pretreatment," Journal of Power Sources 183: 344-346 (2008).
Johnson et al., "Lithium-manganese oxide electrodes with layered-spinel composite structures xLi2MnO3 • (1-x)Li1+yMn2-yO4 (0≤x<1, 0≤y≤0.33) for lithium batteries," Electrochemistry Communications 7 (2005) 528-536.
Johnson et al. "The significance of the Li2MnO3 component in 'composite' xLi2MnO3 • (1-x)LiMn0.5Ni0.5O2 electrodes," Electrochemistry Communications 6 (2004) 1085-1091.
Kang et al., "Enhancing the rate capability of high capacity xLi2Mn03 • (1-x)LiMO2 (M=Mn, Ni, Co) electrodes by Li-Ni-PO4 treatment," Electrochemistry Communications 11 (2009) 748-751.
Kang et al., "The Effects of Acid Treatment on the Electrochemical Properties of 0.5 Li2MnO3-0.5LiNi0.44Co0.25Mn0.31O2 Electrodes in Lithium Cells," Journal of the Electrochemical Society 153(6):A1186-A1192 (2006).
Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.
Kim et al., "Remarkable improvement in cell safety for Li[Ni0.5Co0.2Mn0.3]O2 coated with LiFePO4," Journal of Alloys and Compounds 492 (2010) L87-L90.
Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.
Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152 (9) A1707-A1713 (2005).
Kim et al., "Electrochemical and Structural Properties of xLi2M'O3•(1-x)LiMn0.5Ni0.5O2 Electrodes for Lithium Batteries (M' = Ti, Mn, Zr; 0 ≤ x ≤ 0.3)" Chem. Mater. 2004, 16, 1996-2006.
Kim et al., "Electrochemical Stability of Thin-Film LiCoO2 Cathodes by Aluminum-Oxide Coating," Chem. Mater. 2003, 15(7):1505-1511.
Lee et al., "High capacity Li[Li0.2Ni0.2Mn0.6]O2 cathode materials via a carbonate co-precipitation method," J. of Power Sources, 162 (2006), 1346-1350.
Lee et al., "Electrochemical characteristics of Al2O3-coated lithium manganese spinel as a cathode material for a lithium secondary battery," J. of Power Sources 126 (2004) 150-155.
Luo et al., "On the incorporation of fluorine into the manganese spinel cathode lattice," Solid State Ionics 180 (2009) 703-707.
Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).
Okumura et al., "Cathode having high rate performance for a secondary Li-ion cell surface-modified by aluminum oxide nanoparticles," J. of Power Sources 189 (2009) 471-475.
Ohsawa et al., "The relationship between crystal structure and the electrochemical reaction of Li-rich insertion materials (1)," 2010.
Park et al., "Physical and electrochemical properties of spherical Li1+x(Ni1/3Co1/3Mn1/3)1-xO2 cathode materials", Journal of Power Sources, 177:177-183 (2008).
Park et al., "Lithium-manganese-nickel-oxide electrodes with integrated layered-spinel structures for lithium batteries," Electrochemistry Communications 9 (2007) 262-268.
Robertson et al., "Mechanism of Electrochemical Activity in Li2MnO3," Chem. Mater. 2003, 15, 1984-1992.
Shin et al., "Improvement of electrochemical properties of Li[Ni0.4Co0.2Mn(0.4-x)]O2-yFy cathode materials at high voltage region", Electrochimica Acta 52: 1477-1482 (2006).
Song et al., "Two- and three-electrode impedance spectroscopy of lithium-ion batteries," J. of Power Sources, 2002; 111:255-267.
Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).
Sun et al., "The preparation and electrochemical performance of solid solutions LiCoO2-Li2MnO3 as cathode materials for lithium ion batteries," J of Power Sources 159 (2006) 1353-1359.

(56) References Cited

OTHER PUBLICATIONS

Sun et al, "Significant Improvement of high voltage cycling behavior AlF3-coated LiCoO2 cathode," Electrochemistry Communications 8 (2006) 821-826.

Thackeray et al., "Li2MnO3-stabilized LiMO2 (M = Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn,Ni,Co) for lithium batteries," Electrochemistry Communications 8 (2006), 1531-1538.

Thackeray et al., "Advances in manganese-oxide 'composite' electrodes for lithium-ion batteries," J. Mater. Chem., 2005,15, 2257-2267.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Yabuuchi et al., "Detailed Studies of a High-Capacity Electrode Material for Rechargeable Batteries, Li2MnO3-LiCo1/3Ni1/3Mn1/3O2," J. Am. Chem. Soc. 2011, 133, 4404-4419.

Yabuuchi et al., "Study of Li2MnO3-Li(Co1/3Ni1/3Mn1/3)O2 for High Capacity Positive Electrode Material: II. Redox Reaction at the Positive Electrode/Electrolyte Interface," 2010.

Yoshii et al., "Study of Li2MnO3-Li(Co1/3Ni1/3Mn1/3)O2 for High Capacity Positive Electrode Material: I. Change in the Crystal and Electronic Structure upon Li de-intercalation," 2010.

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Jiang et. al. "Structure, Electrochemical Properties, and Thermal Stability Studies of Cathode Materials in the xLi[Mn1/2Ni1/2]O2-yLiCoO2-zLi[Li1/3Mn2/3]O2 Pseudoternary System (x + y + z = 1)," Journal of the Electrochemical Society, 152(9): A1879-A1889 (2005).

Shin et al., "Synthesis and electrochemical properties of Li[Li(1-2x)/3NixMn(2-x)/3]O2 as cathode materials for lithium secondary batteries," Journal of Power Sources 112: 634-638 (2002).

\* cited by examiner

LITHIUM ION BATTERIES WITH HIGH ENERGY DENSITY, EXCELLENT CYCLING CAPABILITY AND LOW INTERNAL IMPEDANCE

FIELD OF THE INVENTION

The invention relates to lithium ion batteries incorporating high capacity and extremely stable positive electrode active materials that provide for desirable performance parameters for vehicle applications. The invention further relates to particular lithium rich metal oxide compositions.

BACKGROUND OF THE INVENTION

Rechargeable lithium ion batteries, also known as secondary lithium ion batteries are desirable as power sources for a wide range of applications. Their desirability stems from their relative high energy density. The capacities of secondary lithium ion batteries have been greatly improved with the development of high capacity lithium rich metal oxides for use as positive electrode active materials. With cycling, however, secondary lithium ion batteries generally have decreased performance with increased cycle number. For some important applications, such as vehicle application, it is desired that secondary lithium ion batteries be able to charge and recharge for many cycles without a great loss of performance.

SUMMARY OF THE INVENTION

In a first aspect, the invention pertains to a secondary lithium ion battery that comprises a carbon based negative electrode, a positive electrode comprising $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant, a separator between the negative electrode and the positive electrode and an electrolyte comprising lithium ions. The positive electrode of the battery can have a specific capacity of at least about 200 mAh/g cycled against lithium from 4.6V to 2V at a rate of C/10 at room temperature based on the weight of the positive electrode active material. The battery can have a room temperature DC resistance is no more than about 80 ohms-cm² at 20% SOC based on a full charge to 4.35V. In some embodiments, the battery can be activated to 4.6V. In some embodiments, the room temperature DC resistance of the battery does not change by more than a factor of 5 between the lowest value and the largest value over a range of state of charge from 10% to 90% with a full charge voltage of 4.35V. In some embodiments, the room temperature DC resistance of the battery does not change by more than a factor of 4 between the lowest value and the largest value over a range of state of charge from 10% to 90% with a full charge voltage of 4.35V. The battery can have a room temperature area specific DC resistance is no more than about 75 ohms-cm² at 20% SOC based on a full charge to 4.35V. The battery can exhibit an energy density of at least about 180 Wh/kg at a rate of C/3 from 4.35V to 2V at room temperature. In some embodiments, the battery is a pouch battery that comprises a pouch cell enclosure enclosing the electrodes, electrolyte and separator with electrically conductive tabs extending from the enclosure with respective electrical connections with the current collectors.

In a second aspect, the invention pertains to a secondary lithium ion battery comprising a positive electrode comprising a high specific capacity lithium rich metal oxide, a negative electrode comprising graphitic carbon, a separator between the positive electrode and the negative electrode, current collectors respectively associated with the positive electrode and the negative electrode, electrolyte comprising lithium ions dissolved in a nonaqueous solvent, and a pouch cell enclosure enclosing the electrodes, electrolyte and separator with electrically conductive tabs extending from the enclosure with respective electrical connections with the current collectors. The high specific capacity lithium rich metal oxide can be approximately represented by the formula $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant. The battery has a room temperature discharge specific energy of at least about 160 Wh/kg at a discharge rate of C/3 from 4.35V to 2V. In some embodiments, the battery capacity can decrease by no more than about 35% from the $5^{th}$ cycle to the $5000^{th}$ cycle when cycled at room temperature from 4.24V to 2.73V at a rate of C/3, similarly, the battery capacity can decrease by no more than about 80% from the $5^{th}$ cycle to the $1000^{th}$ cycle when cycled at room temperature from 4.24V to 2.73V at a rate of C/3. The average voltage of the battery decreases by no more than about 8% from the $5^{th}$ cycle to the $1000^{th}$ cycle when cycled at room temperature from 4.24V to 2.73V at a rate of C/3. In some embodiments, the battery capacity decreases by no more than about 15% from the $5^{th}$ cycle to the $1000^{th}$ cycle when cycled at room temperature from 4.24V to 2.73V at a rate of C/3. The room temperature DC electrical resistance of the battery does not change by more than a factor of 5 between the lowest value and the highest value over a range of state of charge from 10% to 90% with a full charge voltage of 4.35V. In some embodiments, the parameters in the formula of the lithium rich metal oxide is $0.065 \leq b \leq 0.0895$ (or $0.072 \leq b \leq 0.089$), $0.23 \leq \alpha \leq 0.34$, $0.36 \leq \beta \leq 0.445$, $0.15 \leq \gamma \leq 0.29$, $b+\alpha+\beta+\gamma+\delta$ is approximately equal to 1, or a combination thereof. In some embodiments, A in the formula is magnesium with $0.01 \leq \delta \leq 0.0375$. The negative electrode of the battery can comprise graphitic carbon. In some embodiments, the room temperature DC resistance of the battery is no more than about 4 milli-ohms at 20% SOC based on a full charge to 4.35V. The electrolyte of the battery comprises ethylene carbonate, dimethyl carbonate and methyl ethyl carbonate. The battery can be a pouch battery having a discharge capacity of at least about 5 Ah discharged at a rate of C/10 from about 4.5V to about 1.5V. The pouch battery can have a total of at least 5 positive electrode structures and at least one negative electrode structures for each positive electrode structure with each positive electrode structure and negative electrode structure comprising a metal current collector. Each positive electrode of the pouch battery has an active material density from about 2 g/mL to about 4 g/mL and a total thickness from about 45 microns to about 200 microns and negative electrodes stacked between positive electrodes having an active material density 1.25 g/mL to about 2 g/mL and a total thickness form about 25 microns to about 200 microns. In some embodiment, the room temperature DC resistance of the battery does not change by more than a factor of 4 between the lowest value and the largest value over a range of state of charge from 10% to 90% with a full charge voltage of 4.35V.

In a third aspect, the invention pertains to a lithium-based battery active material comprising a lithium rich metal oxide approximately represented by the formula $Li_{1+b}Ni_\alpha Mn_\beta Co_\gamma A_\delta O_2$ with $0.05 \leq b \leq 0.09$, $0.225 \leq \alpha \leq 0.35$, $0.35 \leq \beta \leq 0.45$, $0.15 \leq \gamma \leq 0.3$, $0 \leq \delta \leq 0.05$ where A is a metal different from lithium, nickel, manganese and cobalt, and up to five mole percent of the oxygen can be replaced with a fluorine dopant. The active material has a specific discharge capacity of at least about 200 mAh/g cycled against lithium from 4.6V to 2V at a rate of C/10 at room temperature based on the weight of the positive electrode active material discharged against lithium. The parameters in the formula of the lithium rich metal oxide can be $0.065 \leq b \leq 0.0895$, $0.23 \leq \alpha \leq 0.34$, $0.36 \leq \beta \leq 0.445$, $0.15 \leq \gamma \leq 0.29$, $0 \leq \delta \leq 0.044$, $b+\alpha+\beta+\gamma+\delta$ is approximately equal to 1, or combination thereof. In some embodiments, $0.24 \leq \alpha \leq 0.33$, $0.38 \leq \beta \leq 0.4425$, $0.15 \leq \gamma \leq 0.275$, $0 \leq \delta \leq 0.0375$. In some embodiments, the lithium-based battery active material can further comprise a non-active inorganic coating. The coating can comprise a metal halide or a metal oxide.

BRIEF DESCRIPTION OF THE DRAWINGS

FIG. 8A is a plot showing the DC-resistance (DCR) protocol used in Example 4 for DCR measurement of batteries 1a and 2a.

DETAILED DESCRIPTION OF THE INVENTION

Figure 1B:
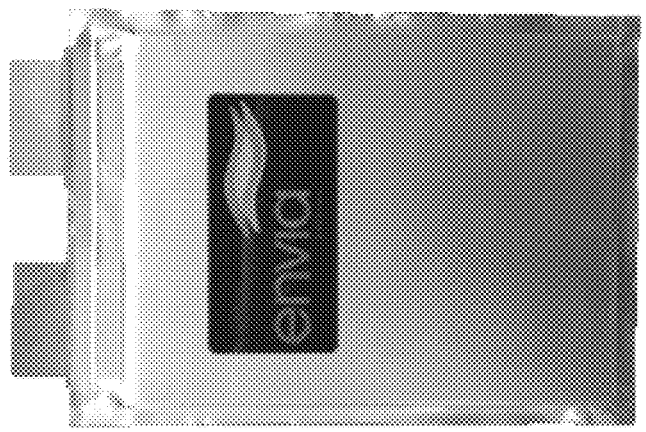
FIG. 1B is a photograph of a pouch cell battery constructed by Envia.

Lithium ion batteries have been designed with respect to the selection of the active compositions and battery parameters to achieve very low impedance of the battery, which in combination with high specific capacity materials can achieve high energy density as well as high power output. The batteries can be designed with relatively low variation of the impedance over a state of discharge from about 10% to about 85%, which is desirable for the maintenance of consistent energy output over the discharge cycle of the battery. In some embodiments, the achievement of the high energy output can be engineered through the use of appropriately selected positive electrode active materials for assembly into the battery. High capacity positive electrode active materials have been developed that are lithium rich. But the composition of the active materials can be designed to be somewhat lower capacity materials to achieve a relatively low electrical resistance that is also very uniform over the discharge of the battery. Improved cycling of these materials have been developed that can exploit much of the high capacity while achieving extraordinary cycling stability. Pouch cell formats can be particularly useful for obtaining high energy densities and high volumetric energy densities. The electrode designs for the batteries can be achieved to obtain the desired performance in practical commercial formats. The resulting batteries are well suited for use in hybrid vehicles and electric vehicles.

The improved batteries described herein incorporate lithium rich metal oxide compositions in the positive electrode. The lithium rich metal oxides can provide a high specific capacity and good rate performance with respect to charging and discharging of a resulting battery. The materials are believed to form multiple phase complex crystal structures, which initially are believed to have a layered-layered structure, i.e., having two distinct layered phases in separate domains within the particles of the material. Significant progress has been made with respect to understanding the chemistry of these materials, although many significant aspects of the chemistry of the materials remain unknown. The results forming the basis for the improvements described herein are at least in part based on the engineering of the specific stoichiometry to achieve desirable battery results. Thus, for certain applications, particularly desirable performance can be obtained, and in particular corresponding batteries exhibit low electrical resistance, which is believed to be due to active materials that have greater electrical conductivity.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Generally, the batteries are formed with lithium ions in the positive electrode material such that an initial charge of the battery transfers a significant fraction of the lithium from the positive electrode material to the negative electrode (anode) material to prepare the battery for discharge. Unless indicated otherwise, performance values referenced herein are at room temperature, i.e., from 22° C. to 25° C.

When the corresponding batteries with intercalation-based positive electrode active materials are in use, the intercalation and release of lithium ions from the lattice induces changes in the crystalline lattice of the electroactive materials. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

The difference between the first charge capacity and the first discharge capacity can be referred to as the irreversible capacity loss, and the irreversible capacity loss is a reflection of at least some of the first cycle irreversible changes in the battery. Generally the irreversible capacity loss is significantly greater than per cycle capacity loss at subsequent cycles. The irreversible capacity loss results in a corresponding decrease in the capacity, energy and power for the cell. With respect to the negative electrode during the first charge of the battery, a reaction involving the electrolyte results in the formation of a solid electrolyte interphase layer associated with the negative electrode active material, and the presence of a stable SEI layer is believed to stabilize the battery with respect to electrolyte degradation during cycling. For lithium rich positive electrode active materials described herein, significant irreversible changes also take place with respect to the composition of the positive electrode active materials, and control of the irreversible changes to the positive electrode active materials can be used effectively to achieve very stable long term cycling properties. The positive electrode active materials described herein are selected to have desirable performance features including a relatively smaller irreversible capacity loss.

The lithium ion batteries can use a positive electrode active material that is lithium rich relative to a reference homogenous electroactive lithium metal oxide composition. The class of lithium rich positive electrode active materials of interest can be approximately represented with a formula:

where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof. Element A and F (fluorine) are optional cation and anion dopants, respectively. Elements A can be, for example, Mg, Sr, Ba, Cd, Zn, Al, Ga, B, Zr, Ti, Ca, Ce, Y, Nb, Cr, Fe, V, or combinations thereof. The use of a fluorine dopant in lithium rich metal oxides to achieve improved performance is described in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference.

As noted above, it is believed that appropriately formed lithium-rich lithium metal oxides have a composite crystal structure. In particular, in some embodiments of lithium rich materials, a layered $Li_2MO_3$ material may be structurally integrated with either a layered $LiM'O_2$ component, in which a reference structure has M and M' being manganese, although particular compositions of interest have a portion of the manganese cations substituted with other transition metal cations with appropriate oxidation states. In some embodiments, the positive electrode material can be represented in two component notation as $xLi_2MO_3 \cdot (1-x)LiM'O_2$ where M' is one or more metal cations with an average valence of +3 with at least one cation being a manganese cation or a nickel cation, and where M is one or more metal cations with an average valence of +4. Generally, for compositions of particular interest, M can be considered to be Mn. The general class of compositions are described further, for example, in published U.S. patent application 2011/0052981A to Lopez et al. (the '981 application), entitled "Layer-Layer Lithium Rich Complex Metal Oxides With High Specific Capacity and Excellent Cycling," incorporated herein by reference.

The compositions expressed in the single component notation and two component notation can be related. Specifically, if $b+\alpha+\beta+\gamma+\delta$ in formula (1) above is approximately equal to 1, the material can be a layered-layered material approximately represented by the formula $x \cdot Li_2MnO_3 \cdot (1-x)LiNi_uMn_vCo_wA_yO_2$, assuming for simplicity that z=0. With respect to the charging of a battery with the composite materials, the lithium manganese oxide ($Li_2MnO_3$) component of the compositions can undergo a reaction to release molecular oxygen with an associated release of 2 Li ions as indicated in equation (2):

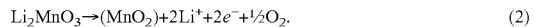

Upon discharge, the ($MnO_2$) composition takes up a single lithium ion and a single electron to form $LiMnO_2$ so that there is an overall significant decrease in capacity due to the irreversible reaction of the material during the initial charge. Such a reaction can at least partially explain the significant irreversible capacity loss associated with the positive electrode active material as well as the release of $O_2$ that is also observed during the first charge of the battery. The product composition is written as ($MnO_2$) because it is not completely clear what this material is.

While Eq. (2) is balanced if ($MnO_2$) is actually $MnO_2$, it is not clear if this is the precise reaction, although observed oxygen release corresponds to a reduction of a metal in the material. Evidence suggests that the reaction schematically represented in Eq. (2) takes place efficiently at voltages above roughly 4.4 volts. Thus, with the lithium rich layered-layered material, during the first cycle charge above roughly 4.2V, decomposition of a $Li_2MnO_3$ component in the high capacity material can lead to oxygen loss and a significant irreversible capacity loss attributable to the positive electrode active material. The materials in principle can undergo other irreversible changes that may coincide with the initial charge step, such as a decomposition reaction $Li_2MnO_3 \rightarrow MnO_2 + Li_2O$. Such a decomposition reaction does not result in a measured irreversible capacity loss since no electrons are generated that would be measured during the initial charge, but such a reaction to form inert lithium oxide could result in a loss of reversible capacity relative to the theoretical capacity for a particular weight of material. The initial reactions involving the active material are not completely understood. Approaches have been found to reduce initial irreversible changes to the positive electrode active materials and to provide extremely stable cycling out to 1000s of charge/discharge cycles.

The formulas presented herein for complex lithium metal oxides are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

While the initial specific capacity of the material generally increases with x at least up to values of roughly 0.6 or greater in the formula $xLi_2MO_3 \cdot (1-x)LiM'O_2$, other properties of a resulting battery may suggest particular stoichiometries to achieve desirable results. For some automobile applications it is highly desirable for a battery to be extremely stable over thousands of charge discharge cycles, and also for the energy output to be stable over most of the charge state of the battery. Compositions have been identified that can provide extremely good stability with cycling and low and stable DC-resistance at discharge and low irreversible capacity loss during battery formation. To achieve such desirable performance, the lithium enrichment and Mn levels have been reduced and compensated by higher levels of Ni, Co or both. Specifically, a particularly desired positive electrode active material can be approximately represented by the formula $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant. This degree of lithium enrichment corresponds with a value $0.105 \leq x \leq 0.286$ in the composition formula in the two component notation. While higher initial specific capacity values can be obtained with larger values of x, the compositions represented by the formula above can be used to obtain very desired performance for some vehicle applications. In some embodiments, particularly desirable performance can be achieved with parameter values of $0.155 \leq x \leq 0.195$ or $0.072 \leq b \leq 0.089$.

While the desired positive electrode active materials are engineered to optimize certain parameters that results in a relative reduction of the specific discharge capacity, the compositions still exhibit relatively high specific discharge capacities, e.g., specific capacities of at least 200 mAh/g over a discharge from 4.6V to 2V at a rate of C/3. Also, to improve the cycling of the resulting batteries, the batteries can be cycled over a portion of the full accessible voltage range of the material. It has been believed that the lithium rich materials should be activated through charging to a high voltage to access the high capacity of the material. Significant progress has been made in understanding the complex lithium rich metal oxides, and this knowledge has provided for significant progress in designing the battery cycling to achieve great cycling performance with reasonably high specific capacities. The outstanding cycling performance can be accomplished through a partial activation of the active material that provides access to a significant portion of the available specific capacity while providing for the amazing cycling performance. The targeted positive electrode active materials described herein provide even flatter cycling performance so that in some embodiments the capacity does not drop by 20% from low cycle values for over 4000 cycles. Similarly, the average voltage drops by no more than 5% over 4000 cycles at a charge rate of 2 C and a discharge rate of 4 C so that the energy output of the battery is amazingly stable with long term cycling.

The selected compositions also exhibit a reduced irreversible capacity loss during the first charge of the material. The reduction of the irreversible capacity loss generally corresponds with a reduction of oxygen release during the first charge of the battery. It is generally desirable to vent released oxygen after the initial battery formation to avoid undesirable pressures within the battery. The generation of less oxygen during the first charge can simplify battery production. The reduction in irreversible capacity loss can be evaluated relative to a charge to 4.6V that activates most of the available battery capacity.

It has been believed that the lithium rich metal oxides should be charged to a high voltage to activate the higher capacity of the material. However, it has been found that partial activation of the material can provide satisfactory activation of the battery capacity while providing a significantly more stable material for cycling. Generally, the battery is then cycled with a charge voltage equal to or somewhat less than the activation voltage. The partial activation of the battery to a charge voltage from about 4.275V to about 4.3V can further reduce the irreversible capacity loss while providing for excellent long term cycling at a relatively high specific capacity. To fully take advantage of the partial activation and the improved cycling properties, a multiple step formation protocol with partial activation has been developed as described in copending U.S. patent application Ser. No. 13/588,162, now U.S. Pat. No. 9,159,990 to Amiruddin et al. filed on the same day as the present application, entitled "High Capacity Lithium Ion Battery Formation Protocol and Corresponding Batteries," incorporated herein by reference.

The selected compositions can be incorporated into batteries that have corresponding improved properties. For electric based vehicle use, a suitable battery generally can be designed to meet a range of performance criterion. Specifically, high capacity batteries can be designed to exploit the desirable properties of the particular designed positive electrode active material while maintaining a high energy density and volumetric energy density. Thus, the batteries can have a low internal impedance and an internal impedance that does not vary by more than a factor of four between the highest value and the lowest value over a range of depth of discharge from 10% to 90%. In some embodiments, this can be accomplished with an energy density of at least about 160 Wh/kg with discharge from 4.35 V to 2V. Furthermore, the battery capacity at 2500 cycles can be at least about 80% of the 10th cycle capacity at a 1 C discharge rate, and the average voltage can be at least about 95% of the 10th cycle average voltage at a 1 C discharge rate. In addition, the battery can exhibit a relatively low irreversible capacity loss and a relatively high specific capacity of the positive electrode active material.

The materials can be assembled into pouch batteries or other battery formats that have suitable performance for vehicle use. Pouch batteries are a desirable format for achieving high energy densities, and the following discussion focuses mostly on pouch battery formats, although other battery formats can exploit at least many of the advantages described herein. Some specific pouch battery parameters that can take advantage of the desirable performance properties are described below. The improved batteries herein generally have multiple electrode layers in a stack to achieve appropriate energy densities.

It is strongly desired for the battery to produce higher quantities of useful power. The internal impedance or electrical resistance in the battery corresponds with an energy used to drive current through the battery. Due to this internal electrical resistance, the voltage across the battery electrodes is less under a load than the open circuit voltage. In principle, the internal impedance can be represented by the $(V_{OC}-V_{load})/I$, where $V_{OC}$ is the open circuit voltage, $V_{load}$ is the voltage under a load and I is the current. A specific procedure for the measurement of the DC-resistance of a battery is given below.

It is desirable to have a lower internal resistance to provide for a greater amount of power available for external work, i.e. energy output from the battery(ies) for vehicle propulsion and accessory operation. The compositions described herein provide for significant decrease in internal resistance. In addition to the availability of a greater amount of available energy, a lower internal resistance also provides for a decrease in heat generation by the battery during use, which provides for a decrease in cooling to maintain the temperature of the battery and surroundings during operation. Very significantly, very flat resistance measurements can be obtained from the batteries over a range of state of charge from 90% to 10%, which allows for consistent power output from the battery over desirable ranges of state of charge so that most of the battery capacity can be exploited in use, especially for vehicle applications.

Battery Structure and Pouch Batteries

Lithium ion batteries generally comprise a positive electrode, a negative electrode, a separator between the negative electrode and the positive electrode and an electrolyte comprising lithium ions. The electrodes are generally associated with metal current collectors. Lithium ion batteries refer to batteries in which the negative electrode active material is a material that takes up lithium during charging and releases lithium during discharging. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors associated respectively with negative electrode and positive electrode. The basic battery structures and compositions are described in this section. Also, improved battery structures and corresponding pouch cell designs are described to take advantage of the decreased electrical resistance that can be obtained with the desired positive electrode active compositions described herein. The resulting improved battery structures can exhibit superior performance properties described herein.

The nature of the negative electrode intercalation/alloying material influences the resulting voltage of the battery since the voltage is the difference between the half cell potentials at the cathode and anode. Suitable negative electrode (anode) lithium intercalation/alloying compositions can include, for example, graphite, synthetic graphite, coke, fullerenes, other graphitic carbons, hard carbon, niobium pentoxide, tin alloys, silicon, titanium oxide, tin oxide, and lithium titanium oxide, such as $Li_xTiO_2$, $0.5 \leq x \leq 1$ or $Li_{1+x}Ti_{2-x}O_4$, $0 \leq x \leq 1/3$. The graphitic carbon and metal oxide negative electrode compositions take up and release lithium through an intercalation or similar process. Silicon and tin alloys form alloys with the lithium metal to take up lithium and release lithium from the alloy to correspondingly release lithium. In general, the primary electroactive composition used in the negative electrode can be used to describe the negative electrode. The term "carbon based negative electrode" is used to refer to an electrode that has an active material comprising predominantly an elemental carbon material, such as graphite, synthetic graphite, coke, fullerenes, other graphitic carbons, hard carbon, or a combination thereof as the primary electroactive composition. Graphite, synthetic graphite and other graphitic carbons can be collectively referred to as graphitic carbons. Carbon based materials can be desirable for use in certain battery applications since some of these materials are presently believed to be the only reliable negative electrode active material that can operate at relatively high voltages with cycling out to 1000 cycles or more.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride (PVDF), polyethylene oxide, polyethylene, polypropylene, polyimide, polytetrafluoroethylene, polyacrylates, rubbers, e.g. ethylene-propylene-diene monomer (EPDM) rubber or styrene butadiene rubber (SBR), copolymers thereof, or mixtures thereof. For PVDF binders, the polymer can have a molecular weight of at least about 800,000 AMU. The use of high molecular weight PVDF polymers has been found to provide for higher powder loadings into the positive electrode without adversely changing the performance of the battery while obtaining a mechanically stable electrode, as disclosed in U.S. Pat. No. 8,187,752 to Buckley et al. (hereinafter the '752 patent), entitled "High Energy Lithium Ion Secondary Batteries," incorporated herein by reference.

The simultaneous achievement in the battery of a high energy density, a high volumetric energy density and low internal resistance or impedance involves a design that balances various factors, and the ability to accomplish such a design while maintaining the ability to have relatively high discharge rates is an important achievement. The high positive electrode active material loading can be accomplished due to the low electrical resistance of the active materials in a battery electrode, which is presumably related to the electrical conductivity of materials themselves. The particle loading of positive electrode active material in the electrode can be large, such as greater than about 85 weight percent, in some embodiments from about 86 to about 95 percent, and in further embodiments from about 88 to about 94 percent. The ability to have high active particle loadings while having a low battery internal impedance is at least partly due to the improved active material compositions described herein. A person of ordinary skill in the art will recognize that additional ranges of active material loading within the explicit range above are contemplated and are within the present disclosure.

To form the electrode, the electroactive powders can be blended with the polymer binder in a suitable liquid, such as a solvent for the polymer. The resulting paste can be pressed into the electrode structure. In general, a positive electrode used herein can comprise from about 1 weight percent to about 10 weight percent binder, in some embodiments, from about 1.5 weight percent to about 8 weight percent, in further embodiments from about 2 weight percent to about 6 weight percent. Sufficient binder is generally included in the electrode to maintain mechanical integrity of the electrode such that current can flow to the current collector with a low resistance. A person of ordinary skill in the art will recognize that additional ranges of binder amounts within the explicit ranges above are contemplated and are within the present disclosure.

The positive electrode generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. The inclusion of a greater amount of electrically conductive material can decrease the electrical resistance in the electrode, but the inclusion of more electrically conductive power generally corresponds with a decrease in the active material loading that decreases energy density and other performance related parameters. Generally, in some embodiments, a positive electrode can comprise from about 1 weight percent to about 10 weight percent, in some embodiments from about 1.5 weight percent to about 8 weight percent, and in further embodiments from about 2 weight percent to about 7 weight percent distinct electrically conductive powder, such as conductive carbon. A person of ordinary skill in the art will recognize that additional ranges of amounts of electrically conductive powders within the explicit ranges above are contemplated and are within the present disclosure.

The carbon based negative electrodes may or may not comprise an electrically conductive non-active component since the carbon based active material may be sufficiently electrically conductive. If the negative electrode comprises a conductive powder in addition to the active material, the negative electrode generally can comprise from about 0.5 to about 10 weight percent, in further embodiments from about 0.75 to about 7 weight percent and in additional embodiments from about 1 to about 5 weight percent distinct electrically conductive powder, such as conductive carbon. The particle loading of carbon based active material in the negative electrode can be, for example, greater than about 85 weight percent, in some embodiments from about 87 to about 98 percent, and in further embodiments from about 90 to about 96 weight percent. To form the negative electrode, carbon based electroactive powders can be blended with the polymer binder in a suitable liquid, such as a solvent for the polymer. The resulting paste can be pressed into the electrode structure. In general, a negative electrode can comprise from about 1 weight percent to about 10 weight percent binder, in some embodiments, from about 1.5 weight percent to about 8 weight percent, in further embodiments from about 2 weight percent to about 6 weight percent binder. A person of ordinary skill in the art will recognize that additional ranges of negative electrode active material, conductive powder and binder loadings within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. For example, copper foil can be used as current collectors for negative electrodes, and aluminum foil can be used as positive electrode current collectors. The electrode material as a paste or slurry can be cast as a thin film onto the current collector. For an electrode stack, the electrodes can be coated on both sides of the current collector, although the end electrodes may or may not be coated on both sides. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm$^2$ (kilograms per square centimeter). The electrodes can be pressed using calendering rolls, a press with a die or other suitable processing apparatus to compress the electrodes to a desired thickness. An increased pressure on the electrode can correspondingly increase the electrode density, but a density that is too high can seriously degrade performance. So the design of the electrode and the selection of materials significantly influences the densities that can be achieved with desirable battery performance.

A positive electrode thus formed and used for batteries described herein can comprise electroactive material loading level on one side of the electrode from about 8.00 mg/cm$^2$ to about 26.00 mg/cm$^2$, in some embodiments from about 10 mg/cm$^2$ to about 24 mg/cm$^2$ and in further embodiments from about 12 mg/cm$^2$ to about 22 mg/cm$^2$. The electrode can have a density from about 2 g/mL to about 4 g/mL, in some embodiment from about 2.2 g/mL to about 3.6 g/mL, and in further embodiments from about 2.4 g/mL to about 3.2 g/mL. The total electrode structure thickness based on the thickness of the current collector and electrode material on both sides of the current collector, is from about 45 micron to about 200 micron, in some embodiment from about 50 micron to about 175 micron, and in further embodiment from about 60 micron to about 150 micron. Aluminum foil current collectors for positive electrode can have a thickness of generally in the range of about 8 microns to about 20 microns. For a particular electrode, the loading on one side of the current collector divided by the density in appropriate units provides the thickness of the electrode on one side of the current collector. A person of ordinary skill in the art will recognize that additional ranges of electrode loading level, density and thickness within the explicit ranges above are contemplated and are within the present disclosure.

In some embodiments, the negative electrodes can have a thickness on each side of the current collector following compression of the anode material from 25 microns to 200 microns, in other embodiments from about 30 microns to about 175 microns, and in further embodiments from 35 microns to 150 microns. In some embodiments, the negative electrode has a density of from about 1.25 g/mL to about 2.0 g/mL and in further embodiments from about 1.5 g/mL to about 1.7 g/mL. Also, the negative electrode can have a loading from about 3 mg/cm$^2$ to about 15 mg/cm$^2$, in further embodiments from about 4 mg/cm$^2$ to about 12 mg/cm$^2$ and in other embodiments from about 5 mg/cm$^2$ to about 10 mg/cm$^2$. A person of ordinary skill in the art will recognize that additional ranges of electrode thickness within the explicit ranges above are contemplated and are within the present disclosure.

The number of electrodes can be selected based on the desired battery performance within the boundaries allowed by the active material. In some embodiments, the batteries have at least 5 positive electrode structures within a stack with negative electrodes, which can have negative electrodes at both ends of the stack. The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. For example, suitable separator materials include, for example, thick multiple layer polymer sheets with thicknesses from 12 microns to 40 microns. Also, ceramic-polymer composite materials have been developed for separator applications. These composite separators can be stable at higher temperatures, and the composite materials can significantly reduce the fire risk. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, lithium bis-oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent application 2011/0136019 filed on Dec. 4, 2009 to Amiruddin et al. (the '019 application), entitled "Lithium Ion Battery With High Voltage Electrolytes and Additives," incorporated herein by reference. The high voltage electrolytes can comprise $LiPF_6$ and/or $LiBF_4$ at a total concentration from about 0.9M to about 2.5M and a solvent comprising ethylene carbonate and a liquid organic solvent comprising dimethyl carbonate, methyl ethyl carbonate, γ-butyrolactone, γ-valerolactone or a combination thereof. To stabilize the cycling properties of batteries with the electrolytes, the electrolytes can further comprise from about 0.01 weight percent to about 5 weight percent of a lithium salt additive, such as lithium difluoro oxalato borate or lithium bis(oxalato)borate and/or an organic additive, such as vinylene carbonate. Also, high voltage electrolytes with good low temperature behavior are described in copending U.S. patent application Ser. No. 13/325,367 to Li et al., entitled "Low Temperature Electrolyte for High Capacity Lithium Based Batteries," incorporated herein by reference.

The electrodes described herein can be incorporated into various commercial battery designs. For example, the cathode compositions can be used for pouch cell batteries, prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Figure 1A:
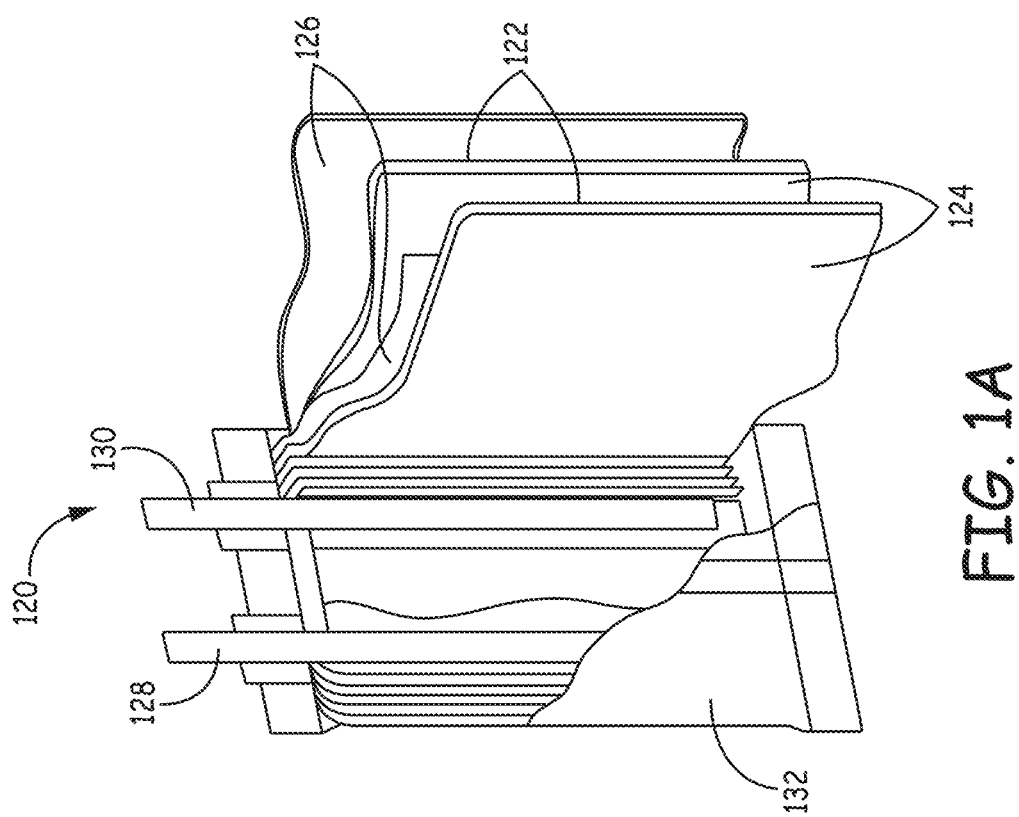
FIG. 1A is a schematic perspective view of a pouch cell battery showing the inner electrodes.

A schematic diagram of a pouch battery is shown in FIG. 1. Specifically, a pouch cell battery 120 is shown schematically having a negative electrode 122, a positive electrode 124 and a separator 126 between negative electrode 122 and positive electrode 124. A pouch battery can comprise multiple positive electrodes and multiple negative electrodes, such as in a stack, with appropriately placed separators. The separator can be folded with the electrode structures placed in the folds of the separator. Electrolyte in contact with the electrodes provides ionic conductivity through the separator between electrodes of opposite polarity. A battery generally comprises current collectors 128, 130 associated respectively with negative electrode 122 and positive electrode 124. The stack of electrodes and separators can be enclosed in a laminated film casing 132. With respect to some specific embodiments, pouch batteries can be constructed as described in the '752 patent and published U.S. patent application 2012/0028105 to Kumar et al., entitled, "Battery Packs for Vehicles and High Capacity Pouch Secondary Batteries for Incorporation Into Compact Battery Packs," both of which are incorporated herein by reference.

Positive Electrode Active Material

The positive electrode active materials of particular interest comprise lithium rich compositions that generally are believed to form a layered-layered composite crystal structure. In some embodiments, the lithium metal oxide compositions specifically comprise Ni, Co and Mn ions with an optional metal dopant. A lithium rich composition can be referenced relative to a composition $LiMO_2$, where M is one or more metals with an average oxidation state of +3. Generally, the lithium rich compositions can be represented approximately with a formula $Li_{1+c}M_{1-d}O_2$, where M represents one or more non-lithium metals, $c \geq 0$, and d is related to c based on the average valence of the metals. When c is greater than 0, the composition is lithium rich relative to the reference $LiMO_2$ composition. In some embodiments, c is from about 0.01 to about 0.33, and d is from about c−0.2 to about c+0.2 with the proviso that $d \geq 0$. In some embodiments, in the layered-layered composite compositions, c can be approximately equal to d. In general, the additional lithium in the lithium rich compositions is accessed at higher voltages such that the initial charge takes place at a relatively higher voltage to access the additional capacity. However, as described herein the material can undergo irreversible changes during an initial high voltage charge step, such that the material that cycles subsequent to the initial charge is not the same material that reacts at high voltage in the initial material. As used herein, the notation (value1≤variable≤value2) implicitly assumes that value 1 and value 2 are approximate quantities.

Lithium rich positive electrode active materials of particular interest can be represented approximately by a formula $Li_{1+b}Ni_\alpha Mn_\beta Co_\gamma A_\delta O_{2-z}F_z$, where b relates to the degree of lithium enrichment, α ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is a metal different from Mn, Ni, or Co, such as Mg, Sr, Ba, Cd, Zn, Al, Ga, B, Zr, Ti, Ca, Ce, Y, Nb, Cr, Fe, V, Li or combinations thereof. In some embodiments, b ranges from about 0.01 to about 0.3, and particular values of b that have been discovered to contribute to desirable performance values are described further below. Some particularly desirable ranges for the transition metals are also described further below. A person of ordinary skill in the art will recognize that additional ranges of parameter values within the explicit compositional ranges above are contemplated and are within the present disclosure. To simplify the following discussion in this section, the optional fluorine dopant is not discussed further, although the option of a fluorine dopant should still be considered for the particular embodiments. Desirable lithium rich compositions with a fluorine dopant are described further in published U.S. patent application 2010/0086854A to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in published U.S. patent application 2011/0052989A to Venkatachalam et al., entitled "Lithium Doped Cathode Material," incorporated herein by reference. The specific performance properties obtained with +2 metal cation dopants, such as $Mg^{+2}$, are described in published U.S. patent application 2011/0244331 to Karthikeyan et al., entitled "Doped Positive Electrode Active Materials and Lithium Ion Secondary Batteries Constructed Therefrom," incorporated herein by reference.

If $b+\alpha+\beta+\gamma+\delta$ is approximately equal to 1, the positive electrode material with the formula above can be represented approximately in two component notation as $xLi_2M'O_3 \cdot (1-x)LiMO_2$ where $0<x<1$, M is one or more metal cations with an average valence of +3 within some embodiments at least one cation being a Mn ion or a Ni ion and where M' is one or more metal cations, such as $Mn^{+4}$, with an average valence of +4. As noted above, it is believed that the corresponding material has two distinct physical phases related to the separate components of the two component notation. The multi-phased material is believed to have an integrated layered-layered composite crystal structure with the excess lithium supporting the stability of the composite material. For example, in some embodiments of lithium rich materials, a layered $Li_2MnO_3$ material may be structurally integrated with a layered $LiMO_2$ component where M represents selected non-lithium metal elements or combinations thereof.

Recently, it has been found that the performance properties of the positive electrode active materials can be engineered around the specific design of the composition stoichiometry. The positive electrode active materials of particular interest can be represented approximately in two component notation as $xLi_2MnO_3 \cdot (1-x)LiMO_2$, where M is one or more metal elements with an average valence of +3 and with one of the metal elements being Mn and with another metal element being Ni and/or Co. For example, M can be a combination of nickel, cobalt and manganese, which, for example, can be in oxidation states $Ni^{+2}$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

The value of x, as with the value of parameter "b" above, relates to the lithium enrichment. In general, $0<x<1$, but in some embodiments $0.03 \leq x \leq 0.55$, in further embodiments $0.05 \leq x \leq 0.325$. Battery designs are described herein that can exhibit high capacities at relatively high discharge rates while maintaining a low DC internal electrical resistance. These battery designs are particularly effective for positive electrode compositions with compositions with $0.03 \leq x \leq 0.29$, in further embodiments $0.05 \leq x \leq 0.275$ and in other embodiments $0.075 \leq x \leq 0.25$, which can be represent in terms of the b parameter of the one component notation as $0.0148 \leq b \leq 0.127$, in further embodiments $0.0244 \leq b \leq 0.1209$ and in other embodiments $0.0361 \leq b \leq 0.1111$. It has been discovered that for performance for certain application an important balance of moderately high capacity and low internal electrical resistance can be achieved with values of b as specified as $0.05 \leq b \leq 0.09$, in some embodiments $0.065 \leq b \leq 0.0895$ and in further embodiments $0.072 \leq b \leq 0.089$, which corresponds with values of the parameter x in the two component notation as $0.105 \leq x \leq 0.198$, in some embodiments $0.139 \leq x \leq 0.197$ and in further embodiments $0.155 \leq x \leq 0.195$. A person of ordinary skill in the art will recognize that additional ranges within the explicit ranges of parameter x above are contemplated and are within the present disclosure.

In some embodiments, M as represented in the two component notation above can be written as $Ni_u Mn_v Co_w A_y$. For embodiments in which y=0, this simplifies to $Ni_u Mn_v Co_w$. If M includes Ni, Co, Mn, and optionally A the composition can be written alternatively in two component notation and single component notation as the following.

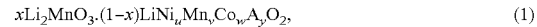
$$xLi_2MnO_3 \cdot (1-x)LiNi_u Mn_v Co_w A_y O_2, \quad (1)$$

$$Li_{1+b}Ni_\alpha Mn_\beta Co_\gamma A_\delta O_2, \quad (2)$$

with $u+v+w+y \approx 1$ and $b+\alpha+\beta+\gamma+\delta \approx 1$. The reconciliation of these two formulas leads to the following relationships:

$b=x/(2+x)$,
$\alpha=2u(1-x)/(2+x)$,
$\beta=2x/(2+x)+2v(1-x)/(2+x)$,
$\gamma=2w(1-x)/(2+x)$,
$\delta=2y(1-x)/(2+x)$, and similarly, $x=2b/(1-b)$,
$u=\alpha/(1-3b)$,
$v=(\beta-2b)/(1-3b)$,
$w=\gamma/(1-3b)$,
$y=\delta/(1-3b)$.

In some embodiments, it may be desirable to have $u \approx v$, such that $LiNi_u Mn_v Co_w A_y O_2$ becomes approximately $LiNi_u Mn_u$-

$Co_wA_yO_2$. In this composition, when y=0, the average valence of Ni, Co and Mn is +3, and if u≈v, then these elements can have valences of approximately $Ni^{+2}$, $Co^{+3}$ and $Mn^{+4}$ to achieve the average valence. When the lithium is hypothetically fully extracted, all of the elements go to a +4 valence. A balance of Ni and Mn can provide for Mn to remain in a +4 valence as the material is cycled in the battery. This balance avoids the formation of $Mn^{+3}$, which has been associated with dissolution of Mn into the electrolyte and a corresponding loss of capacity. However, this perspective assumes maintenance of the two distinct phases with the phases remaining stable as the battery is cycled, and a more intricate view has been found.

With respect to obtaining the desired improved electrical conductivity to provide decreased DC electrical resistance, desired ranges of composition parameters have moderate levels of cobalt and/or nickel. The transition metal and optional dopant levels that follow apply for both sets of ranges for the lithium enrichment above and such combination is explicitly recited here without copying the ranges. In some embodiments, the Ni, Mn, Co and A values in the composition formula (2) above can be specified as $0.225 \leq \alpha \leq 0.35$, $0.35 \leq \beta \leq 0.45$, $0.15 \leq \gamma \leq 0.3$, $0 \leq \delta \leq 0.05$, in further embodiments as $0.23 \leq \alpha \leq 0.34$, $0.36 \leq \beta \leq 0.445$, $0.15 \leq \gamma \leq 0.29$, $0 \leq \delta \leq 0.04$, and in other embodiments as $0.24 \leq \alpha \leq 0.33$, $0.38 \leq \beta \leq 0.4425$, $0.15 \leq \gamma \leq 0.275$, $0 \leq \delta \leq 0.0375$, with the proviso that $b+\alpha+\beta+\gamma+\delta \approx 1$. A person of ordinary skill in the art will recognize that additional ranges of composition parameters within the explicit ranges and independently varied between the 4 separate parameters above as well as the lithium enrichment parameter (b) in the ranges in the above paragraphs are contemplated and are within the present disclosure.

In general, various processes can be performed for synthesizing the desired lithium rich metal oxide materials described herein having nickel, cobalt, manganese and additional optional metal cations in the composition and exhibiting the high specific capacity performance. In particular, for example, sol gel, co-precipitation, solid state reactions and vapor phase flow reactions can be used to synthesize the desired materials. In addition to the high specific capacity, the materials can exhibit a good tap density which leads to high overall capacity of the material in fixed volume applications. Specifically, lithium rich metal oxide compositions were used in coated forms to generate the results in the Examples below.

Specifically, the synthesis methods based on co-precipitation have been adapted for the synthesis of compositions with the formula $Li_{1+b}Ni_\alpha Mn_\beta Co_\gamma A_\delta O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH \cdot H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in published U.S. patent application 2010/0151332A (the '332 application) to Lopez et al. entitled "Positive Electrode Materials for High Discharge Capacity Lithium Ion Batteries", both incorporated herein by reference.

Coatings and Formation of Coatings on Positive Electrode Active Materials

Inorganic coatings, such as metal halide coatings and metal oxide coatings, on lithium rich positive electrode active materials have been found to significantly improve the performance of lithium ion batteries, although the coatings are believed to be inert with respect to battery cycling. In particular, the cycling properties of the batteries formed from coated lithium metal oxides have been found to significantly improve from the uncoated material. Additionally, the specific capacity of the batteries also shows desirable properties with the coatings, and the irreversible capacity loss of the first cycle of the battery can be reduced in some embodiments. These performance improvements can be similarly exploited in the improved cycling described herein.

With respect to metal oxide and metal halide coatings, a coating with a combination of metal and/or metalloid elements can be used for the coating compositions. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. Metal fluoride coatings are described generally in published PCT application WO 2006/109930A to Sun et al., entitled "Cathode Active Materials Coated with Fluorine Compound for Lithium Secondary Batteries and Method for Preparing the Same," incorporated herein by reference. It has been found that metal/metalloid fluoride coatings can significantly improve the performance of lithium rich layered compositions for lithium on secondary batteries. See, for example, the '853 application and the '332 application cited above, as well as published U.S. patent application number 2011/0111298 (the '298 application) to Lopez et al., entitled "Coated Positive Electrode Materials For Lithium Ion Batteries," incorporated herein by reference. Desirable performance results for non-fluoride metal halide coatings have been described in copending U.S. patent application Ser. No. 12/888,131, now U.S. Pat. No. 8,663,849 B2 to Venkatachalam et al., entitled "Metal Halide Coatings on Lithium Ion Battery Positive Electrode Materials and Corresponding Batteries," incorporated herein by reference. This patent application also discusses methods for formation of desired metal halide coatings.

An increase in capacity and a reduction in irreversible capacity loss were noted with $Al_2O_3$ coatings by Wu et al., "High Capacity, Surface-Modified Layered Li[Li$_{(1-x)/3}$Mn$_{(2-x)/3}$Ni$_{x/3}$Co$_{x/3}$]O$_2$ Cathodes with Low Irreversible Capacity Loss," Electrochemical and Solid State Letters, 9 (5) A221-A224 (2006), incorporated herein by reference. The use of a LiNiPO$_4$ coating to obtain improved cycling performance is described in an article to Kang et al. "Enhancing the rate capability of high capacity xLi$_2$MnO$_3$ (1-x)LiMO$_2$ (M=Mn, Ni, Co) electrodes by Li—Ni—PO$_4$ treatment," Electrochemistry Communications 11, 748-751 (2009), incorporated herein by reference, and this article can be referenced generally with respect to the formation of metal phosphate coatings. Desirable properties of metal oxide coatings on lithium rich positive electrode active materials are described further in published U.S. patent application 2011/0076556A to Karthikeyan et al., entitled "Metal Oxide Coated Positive electrode Materials for Lithium-Based Batteries," incorporated herein by reference.

In some embodiments, the coating improves the specific capacity of the batteries even though the coating itself is not electrochemically active. However, the coatings also influence other properties of the active material, such as the average voltage, thermal stability and impedance. The selection of the coating properties can incorporate additional factors related to the overall range of properties of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of coating materials to achieve desired improvement in battery performance can be related to the particle size and surface area of the uncoated material. Further discussion of the effects of coating thickness on the performance properties for coated lithium rich lithium metal oxides is found in the '298 application cited above.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, NH$_4$F can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Battery Performance and Cycling

The improved positive electrode active materials described herein provide for moderate specific capacities at lower discharge rates and excellent high rate performance. The positive electrode active materials provide for the formation of batteries with relatively high energy densities and high volumetric energy densities, while providing low electrical resistance, flat electrical resistance over a broad range of state of charge, and outstanding cycling over 1000s of charge/discharge cycles with low fade in capacity and average voltage. The lithium ion batteries described herein can exhibit extremely good performance for parameters that are significant for vehicle applications. Specifically, the batteries exhibit very flat electrical resistance over a broad range of state of charge so that a greater portion of the battery cycle can be exploited with relatively consistent power output of the battery. The excellent rate capability provides for greater power output to meet specific power demands. Also, extremely flat cycling performance out to thousands of cycles at room temperature provides for long battery life consistent with vehicle applications. The high energy density and volumetric energy density provide for corresponding modest weight and space usage in a vehicle.

The desirable positive electrode active materials described herein provide for a moderate specific capacity at lower discharge rates and surprisingly high specific capacities at high discharge rates. Specifically, the positive electrode active materials with reduced lithium enrichment and moderate cobalt levels can exhibit a discharge specific capacity of at least about 200 mAh/g cycled, in further embodiments at least about 205 mAh/g, and in additional embodiments from about 210 mAh/g to about 235 mAh/g against lithium from 4.6V to 2V at a rate of C/10 at room temperature based on the weight of the positive electrode active material. The improved high rate discharge performance can be conveniently expressed in terms of the drop in specific capacity at a rate of 2 C in comparison with the specific discharge rate at C/5, in which high rate capable materials exhibit a reduced drop in specific capacity at higher rates. Consistent with the relatively large specific capacities, the difference between the C/5 specific capacity and the 2 C specific capacity can be no more than 40 mAh/g, in further embodiments no more than about 37.5 mAh/g and in further embodiments from about 20 mAh/g to about 35 mAh/g. A person of ordinary skill in the art will recognize that additional ranges of specific capacities for the positive electrode active materials within the explicit ranges above are contemplated and are within the present disclosure.

The improvements in desired performance parameters for the positive electrode active material can be combined with corresponding improved battery designs to provide significant improvements in battery performance, especially for pouch batteries that have relatively low proportion of weight and volume contributions from container materials. With carbon based negative electrode active materials, the lithium ion secondary battery can have a discharge energy density of at least about 180 Wh/kg at a discharge rate of C/3 from 4.35V to 2V, in further embodiments at least about 182.5 Wh/kg and in additional embodiments from about 185 Wh/kg to about 230 Wh/kg at a discharge rate of C/3 from 4.35V to 2V. Also, the battery can have a volumetric energy density of at least about 300 Wh/l (watt hours/liter), in further embodiments at least about 310 Wh/l and in additional embodiments from about 320 Wh/l to about 400 Wh/l.

A person of ordinary skill in the art will recognize that additional ranges of energy density within the specific ranges above are contemplated and are within the present disclosure.

Furthermore, the battery can exhibit low internal impedance, i.e., electrical resistance, which provides for improved power output. The electrical resistance is evaluated herein using a 10 second pulse at a rate of 1 C. The electrical resistance is then calculated based on measurements at the beginning and end of the pulse using the following formula:

$$\text{Discharge Resistance} = \frac{(\text{Voltage 1} - \text{Voltage 2})}{(\text{Current 1} - \text{Current 2})}$$

The electrical resistance is a direct indication of how the cells would behave in terms of power available for performing external work. A higher electrical resistance results in a lower power available for external work, and a lower electrical resistance in the battery results in a greater power available for external work. The electrical resistance can be normalized by multiplying by the total surface area of the smaller electrode, generally the cathode, to remove a size dimension of the battery that directly influences the internal resistance, such that the values (Area Specific Impedance) are reported then in ohm-square centimeter (ohm-cm$^2$). The surface area is calculated based on adding the surface area from the various electrodes if there is a plurality of electrodes counting double if the electrode material is coated on both sides of the current collector. For example, if there are 5 cathode structures coated on sides of a current collector foil, the total area would be 10 times the surface area of the cathode on one coated side of the current collector. In particular, the batteries can exhibit a room temperature DC resistance normalized by multiplying by electrode area of no more than about 80 ohm-cm$^2$ at 20% state of charge (SOC, 20% SOC=80% depth of discharge (DOD)) based on a full charge to 4.35V, in further embodiments no more than about 70 ohm-cm$^2$ and in additional embodiments no more than about 65 ohm-cm$^2$ at a 20% SOC based on a full charge at 4.35V. In some embodiments, the battery can be activated to 4.6V. The flatness of the electrical resistance over a broad range of SOC is advantageous for the effective use of a broader range of the battery capacity for desired applications so that the power output of the battery does not drop excessively before a significant amount of capacity has been effectively used. In some embodiments, the internal electrical resistance of the batteries does not change by more than a factor of 5 between the lowest value and the highest value, in further embodiments no more than a factor of 4 and in additional embodiments no more than a factor of 3 between the highest value and the lowest value over a range of SOC from 10% to 90% with a full charge voltage of 4.35V. A person of ordinary skill in the art will recognize that additional ranges of electrical resistance and electrical resistance flatness over SOC within the explicit ranges above are contemplated and are within the present disclosure.

In addition to very desirable performance of the batteries initially, the improved batteries described herein can maintain desirable performance out to an extraordinary number of cycles. In particular, the long term cycling can be particularly stable with a partial activation formation protocol specified in copending U.S. patent application Ser. No. 13/588,162, now U.S. Pat. No. 9,159,990 to Amiruddin et at entitled "High Capacity Lithium Ion Battery Formation Protocol And Corresponding Batteries", incorporated herein by reference, along with, in some embodiments, cycling of the battery at or within a voltage window with a charge voltage of no more than about 4.39V. However, outstanding cycling is even obtained with full activation to 4.6V. During actual use, the use of the battery generally charges the battery at irregular intervals and discharges the battery during use based on specific power usage. For evaluation of the battery with respect to performance and as noted in the claims, battery cycling can be considered over a voltage range of 4.24V to 2.73V. In some embodiments, the battery capacity decreases by no more than about 20% from the $5^{th}$ cycle to the $1000^{th}$ cycle, in further embodiments, no more than about 17%, in additional embodiments no more than about 15% and in other embodiments no more than about 14% from the $5^{th}$ cycle to the $1000^{th}$ cycle when cycled from 4.24V to 2.73V at a rate of C/3 or also over at least over a range of rates up to 4 C at room temperature. Similarly, the battery capacity can decrease by no more than about 30% from the $5^{th}$ cycle to the 5000th cycle, in further embodiments, no more than about 25%, in additional embodiments no more than about 22.5% and in additional embodiments no more than about 20% from the 5th cycle to the 5000th cycle when cycled from 4.24V to 2.73V at a rate of C/3 or also over at least over a range of rates up to 4 C at room temperature. Also, the average voltage of the battery can decrease by no more than about 8% from the $5^{th}$ cycle to the 1000th cycle or even the $5000^{th}$ cycle, in further embodiments, no more than about 6%, and in additional embodiments no more than about 5% from the 5th cycle to the 1000th cycle or even at the 5000th cycle when cycled from 4.24V to 2.73V at a rate of C/3 or also over at least over a range of rates up to 4 C at room temperature. At 45° C., the battery can have a battery capacity that decreases by no more than about 35% from the 5th cycle to the 1000th cycle, in further embodiments no more than about 30% and in additional embodiments no more than about 25% from the 5th cycle to the 1000th cycle when cycled from 435V to 2.2V at a rate of 1 C. A person of ordinary skill in the art will recognize that additional ranges of cycling performance within the explicit ranges above are contemplated and are within the present disclosure.

EXAMPLES

To test positive electrodes with different compositions, batteries were constructed and tested against graphitic carbon or lithium foil as the counter electrode. The general procedure for formation of the coin batteries is described in the following discussion. Additionally, the positive electrodes and the graphite negative electrode were assembled to pouch cell batteries with one or a plurality of layers of each electrode. The individual examples below describe formulation of the electrodes and the batteries and the performance results from the batteries. All percentages reported in the examples are weight percents.

The examples below in general use lithium metal oxides that are high capacity positive electrode material approximately described by the formula $Li_{1+b}Ni_\alpha Mn_\beta Co_\gamma A_\delta O_2$ with $0.05 \le b \le 0.125$, $0.225 \le \alpha \le 0.35$, $0.35 \le \beta \le 0.45$, $0.15 \le \gamma \le 0.3$, $0 \le \delta \le 0.05$, where A is a metal different from lithium, nickel, manganese and cobalt, and up to live mole percent of the oxygen can be replaced with a fluorine dopant. Positive electrodes were formed from the high capacity positive electrode material powders by initially mixing it thoroughly with conductive carbon to form a homogeneous powder mixture. Separately, polyvinylidene fluoride (PVDF, KF1300™ from Kureha Corp., Japan) was mixed with N-methyl-pyrrolidone (NMP, Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised from about 88 weight percent to 94 weight percent active metal oxide, from about 2 weight percent to about 7 weight percent conductive carbon, and from about 2 weight percent to about 6 weight percent polymer binder. The loading level on one side of the electrode is from about 7 $mg/cm^2$ to about 17.00 $mg/cm^2$. The electrodes have a density from about 2.4 g/mL to about 3.2 g/mL. The total electrode structure thickness is from about 45 micron to about 150 micron.

A negative electrodes were formed from graphitic carbon or elemental lithium. The graphitic carbon based negative electrodes comprised at least about 75 weight percent graphite and at least about 1 weight percent acetylene black with the remaining portion of the negative electrode being polymer binder. The acetylene black was initially mixed with NMP solvent to form a uniform dispersion. The graphite and polymer were added to the dispersion to form a slurry. The slurry was applied as a thin-film to a copper foil current collector. A negative electrode was formed by drying the copper foil current collector with the thin wet film in vacuum oven at 110° C. for about two hours to remove NMP. The negative electrode material was pressed between rollers of a sheet mill to obtain a negative electrode with desired thickness. Elemental lithium negative electrodes were formed from lithium foil (FMC Lithium) having thickness of 125-150 microns.

An electrolyte was selected to be stable at high voltages, and appropriate electrolytes are described in published U.S. patent application 2011/0136019 to Amiruddin et al., entitled "Lithium Ion Battery With High Voltage Electrolytes and Additives," incorporated herein by reference.

For batteries with the lithium foil counter electrodes, the electrodes Were placed inside an argon filled glove box for the fabrication of the coin cell batteries. Lithium foil (FMC Lithium) having thickness of roughly 125 micron was used as a negative electrode. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles. Coin cell batteries with graphite carbon as negative electrode were formed following similar procedures.

Pouch cell batteries were constructed for example with a single positive electrode plate and negative electrode plate or in some embodiments with a plurality of positive electrode plates and negative electrode plate, e.g., with 15-40 negative electrode plates alternating with positive electrode plates such that a negative electrode plate was positioned at both ends of the stack, i.e., there is one fewer positive electrode plates than negative electrode plates. Positive electrodes were formed as described above with the current collector coated on both sides and with a portion of the aluminum current collector left uncoated to serve as tab attachment points. Graphitic carbon electrode is used as negative electrode. With respect to batteries described below with approximately 1 Ah capacity, the negative electrodes have a surface area of about 3.1 cm×4.35 cm and the positive electrodes had a surface area of about 3 cm×4.25 cm. The positive and negative electrodes were alternately stacked and a single trilayer (polypropylene/polyethylene/polypropylene) micro-porous separator (2320 from Celgard, LLC, NC, USA) was folded in a Z-pattern with an appropriate electrode in each fold and a negative electrode at the surface of the folded structure so that a negative electrode is located at the ends of the stacks. Nickel and aluminum tabs were then attached to the negative and positive electrodes, respectively, and the stack was placed in a pouch bag and sealed at three edges. Electrolyte was then added to the stack through the fourth, open edge and the fourth edge was then sealed. Single layer pouch cell batteries were similarly formed with one negative electrode plate and one positive electrode plate separated by a single sheet trilayer separator. Unless indicated otherwise, the batteries during the first cycle were activated to 4.6V using a two step formation protocol as described in published U.S. patent application 2011/0236751 to Amiruddin et al., entitled "High Voltage Battery Formation Protocols and Control of Charging and Discharging for Desirable Long Term Cycling Performance," incorporated herein by reference.

Example 1

Synthesis of Cathode Materials and Corresponding Electrodes and Batteries

High capacity cathode materials with compositions 1-2 outlined in the Table 1 below were synthesized using a procedure disclosed in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference. The stoichiometry of the compositions 1-2 are outlined in Table 1 below.

TABLE 1

| Composition | X | Mg | Mn (% transition metals) |
|---|---|---|---|
| 1 | 0.175 | 0 | 0.45 |
| 2 | 0.3 | 0.01 | 0.51 |

Compositions 1 and 2 were then used to construct corresponding positive electrodes 1 and 2, which were in turn used to construct batteries 1 and 2 with lithium metal counter electrodes using the procedure outlined above. Additionally, single layer pouch cell batteries 1a and 2a were constructed using the corresponding compositions 1 and 2 above against graphitic carbon counter electrode using the procedure outlined above. Pouch cell battery 2b with 1 Ah capacity was constructed using composition 2 with graphitic carbon counter electrode following the procedure outlined above. All of the materials synthesized were coated with an aluminum halide stabilization coating.

Example 2

Discharge Capacities of the Batteries from Example 1

This example provides specific capacities for the positive electrode active materials through cycling the batteries against lithium metal foil in coin cells.

Figure 2:
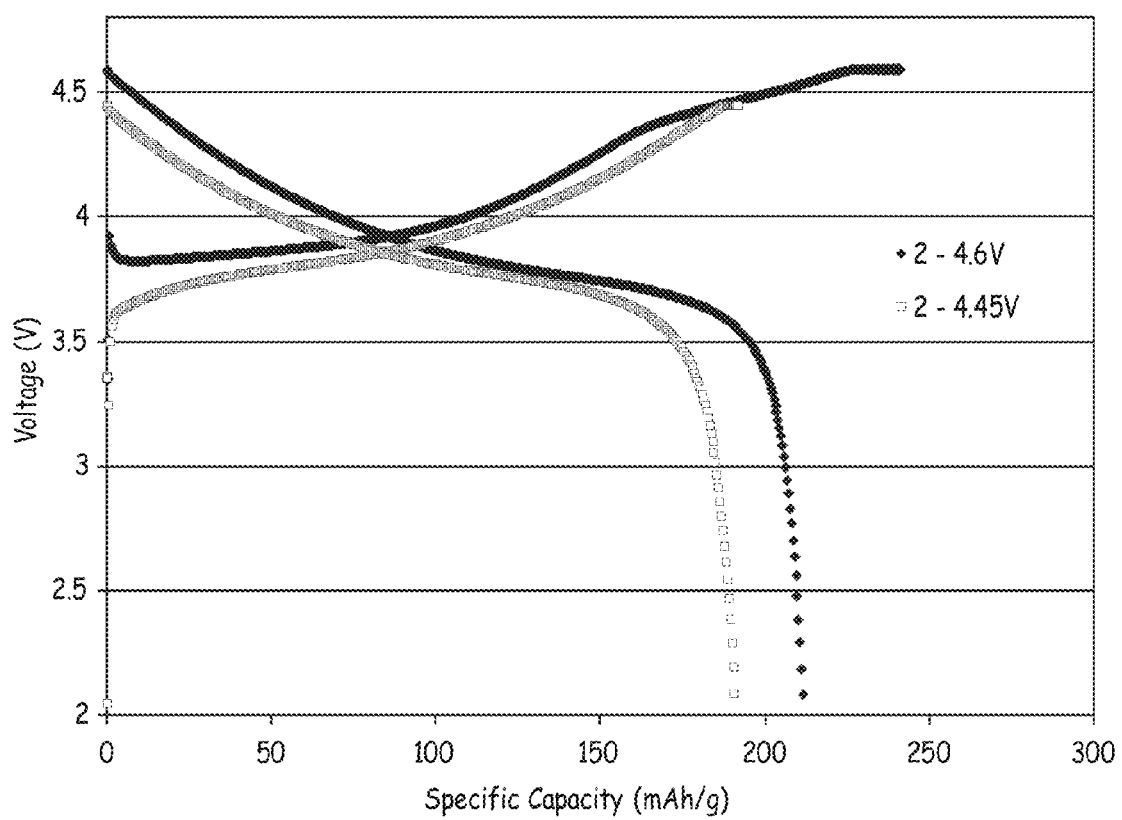
FIG. 2 is a plot of the first cycle and the second cycle charge and discharge specific capacities of battery 1 from Example 1 in specified voltage windows.
Figure 3:
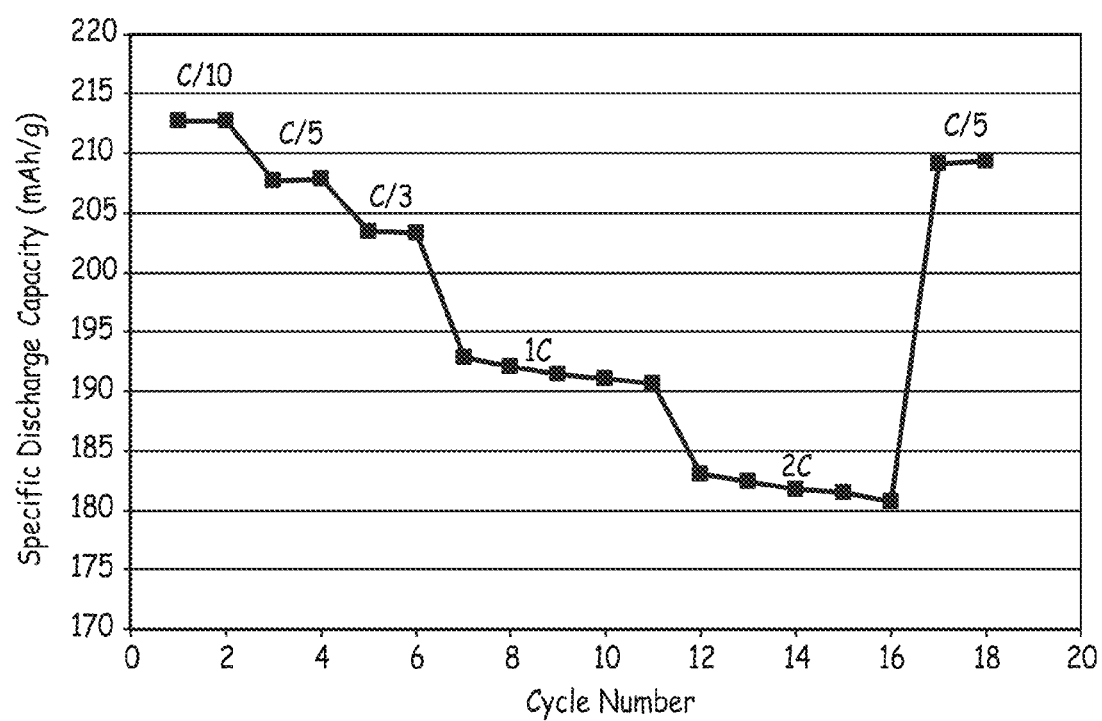
FIG. 3 is a plot of discharge capacities versus cycle numbers of battery 1 at different discharge rates.

Battery 1 from Example 1 is cycled at rate C/10 between 4.6-2 V for the first cycle and between 4.45-2V for the second cycle and the results are shown in FIG. 2. The first cycle discharge capacity of battery 1 is about 2121n Ah/g. For cycling studies, battery 1 was discharged at a rate of C/10 for the $1^{st}$ and $2^{nd}$ cycles, at a rate of C/5 for the $3^{rd}$ and $4^{th}$ cycles, at a rate of C/3 for the $5^{th}$ and $6^{th}$ cycles, at 1 C for cycles $7^{th}$ to $11^{th}$, at 2 C for cycles $12^{th}$ to $16^{th}$, and at C/5 for cycles $17^{th}$ and $18^{th}$, respectively between 4.6-2V. The cycling performance of battery 1 is shown in FIG. 3. Although the specific discharge capacity of the battery decreased significantly at high cycling rates such as 1 C and 2 C, the specific discharge capacity appears to be above 210 mAh/g at C/10, above 205 mAh/g at C/5, and above 200 mAh/g at C/3. Even at the fast discharge rate of 2 C, battery 1 appears to have specific discharge capacity above 180 mAh/g. After the higher rate discharge cycles, the specific discharge capacity of battery 1 maintained above 205 mAh/g at C/5 at cycles 17 and 18.

Figure 4:
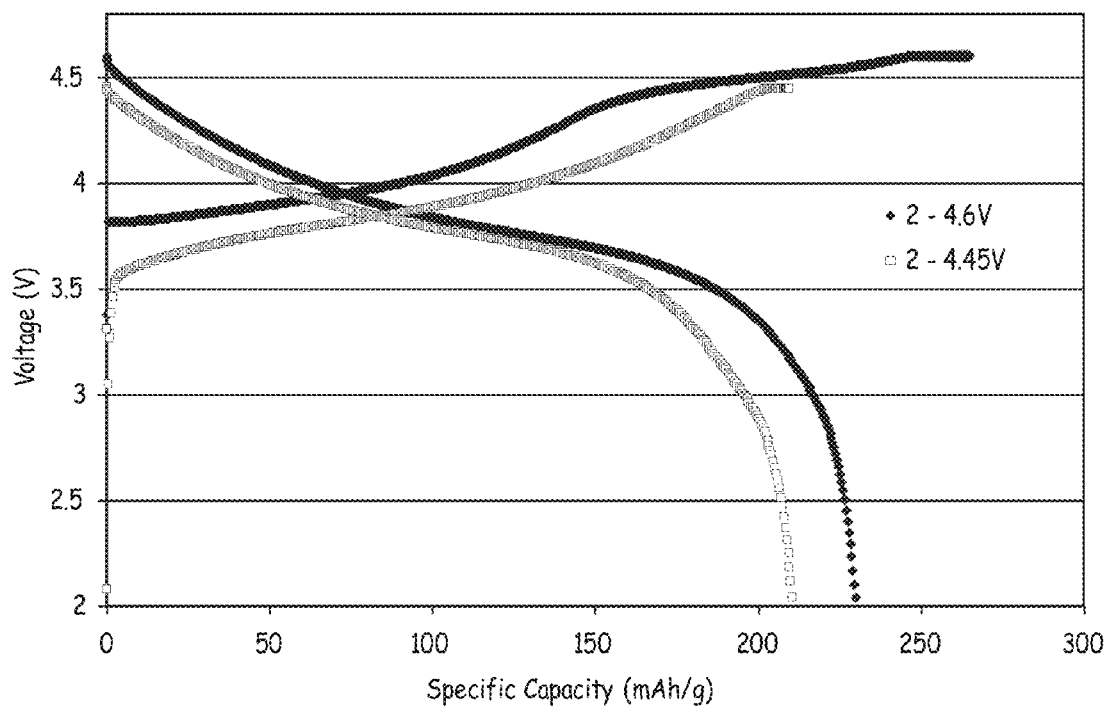
FIG. 4 is a plot of the first cycle and the second cycle charge and discharge specific capacities of battery 2 from Example 1 in specified voltage windows.
Figure 5:
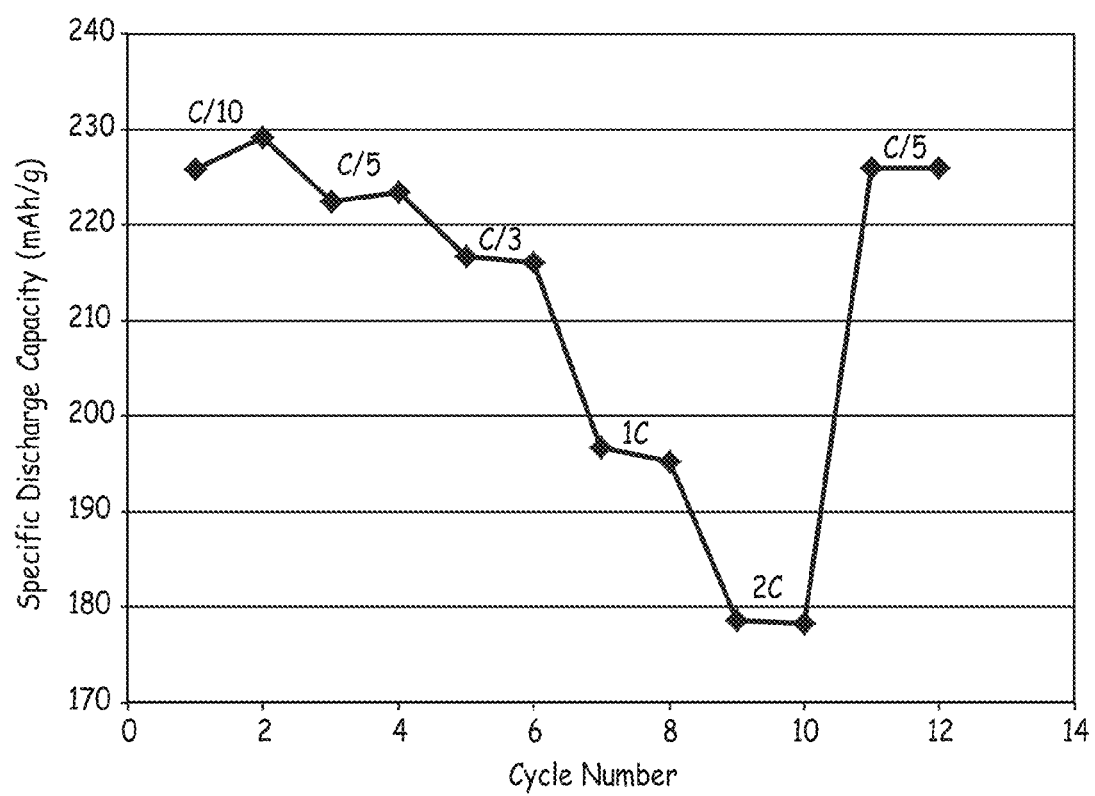
FIG. 5 is a plot of discharge capacities versus cycle numbers of battery 2 at different discharge rates.

Battery 2 from Example 1 is cycled at rate C/10 between 4.6-2 V for the first cycle and between 4.45-2V for the second cycle and the results are shown in FIG. 4. The first cycle discharge capacity of battery 2 is about 230 mAh/g. For cycling studies, battery 2 was discharged at a rate of C/10 for the $1^{st}$ and $2^{nd}$ cycles, at a rate of C/5 for the $3^{rd}$ and $4^{th}$ cycles, at a rate of C/3 for the $5^{th}$ and $6^{th}$ cycles, at 1 C for the $7^{th}$ and the $8^{th}$ cycles, at 2 C for the $9^{th}$ and the $10^{th}$ cycles, and at C/5 for the $11^{th}$ and the $12^{th}$ cycles, respectively between 4.6-2V. The cycling performance of battery 2 is shown in FIG. 5. Although the specific discharge capacity of the battery decreased significantly at high cycling rates such as 1 C and 2 C, the specific discharge capacity appears to be above 225 mAh/g at C/10, above 220 mAh/g at C/5, and above 215 mAh/g at C/3. At the very fast discharge rate of 2 C, battery 2 appears to have specific discharge capacity above 175 mAh/g. After the accelerated discharge cycles, the specific discharge capacity of battery 2 maintained above 220 mAh/g at C/5. The C/10 discharge capacities of batteries 1 and 2 are outlined in Table 2 below for comparison.

TABLE 2

| Battery | C/10 Discharge Capacity (mAh/g) |
|---|---|
| 1 | 212 |
| 2 | 230 |

Example 3

Long Time Cycling of Pouch Batteries

This example demonstrates outstanding cycling of batteries with the desirable compositions described herein in a pouch battery format at both room temperature and at higher temperature.

Figure 6:
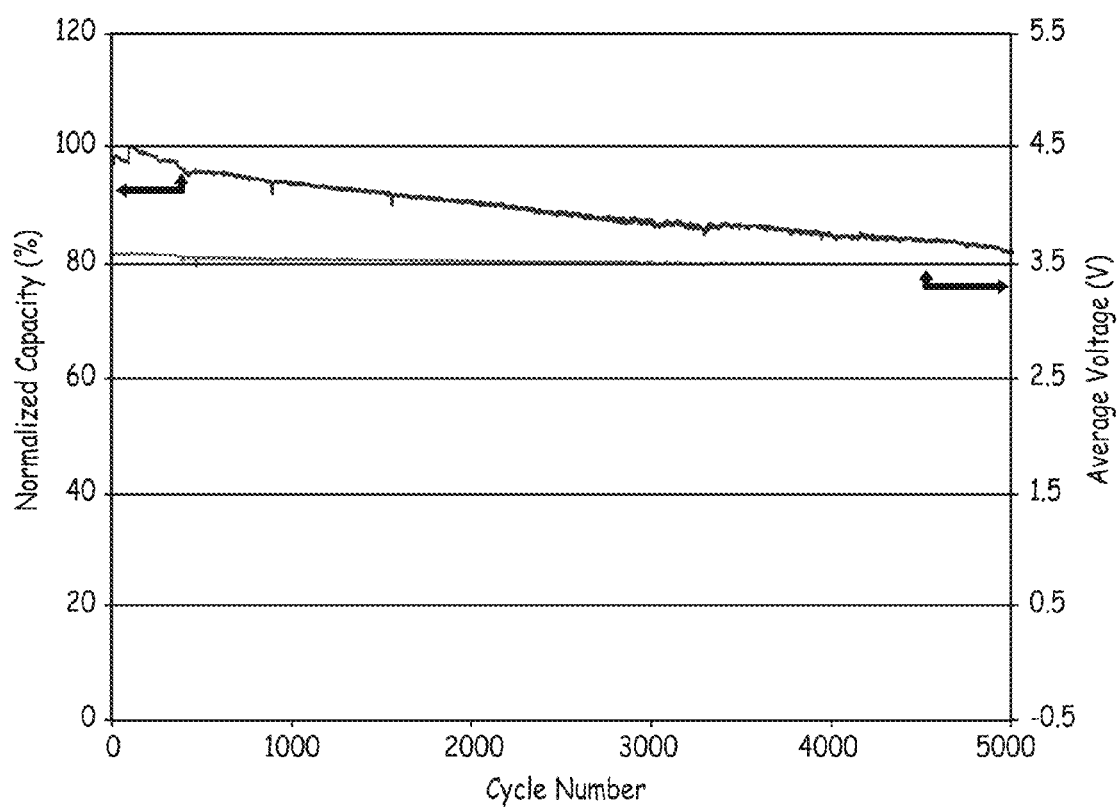
FIG. 6 is a plot showing capacity retention and average voltage of battery 1a from Example 1 cycled for 5000 cycles at accelerated cycling rate and at 80% depth of discharge (DOD).

To test the performance of the batteries at accelerated charge/discharge rates at common operating depth of discharge (DOD), single layer pouch cell battery 1a from example 1 was cycled for 5000 cycles from 4.24V to 2.73V (80% depth of discharge after activation with a two step protocol to 4.6V during the first cycle) at 2 C charge and 4 C discharge rates. As shown in the FIG. 6, after cycling at accelerated charge/discharge rates for 5000 cycles, battery 1a appears to maintained at least 80% capacity retention and with nearly unchanged average voltage of around 3.5 volts. Thus, the battery exhibited extraordinary cycling stability.

Figure 7:
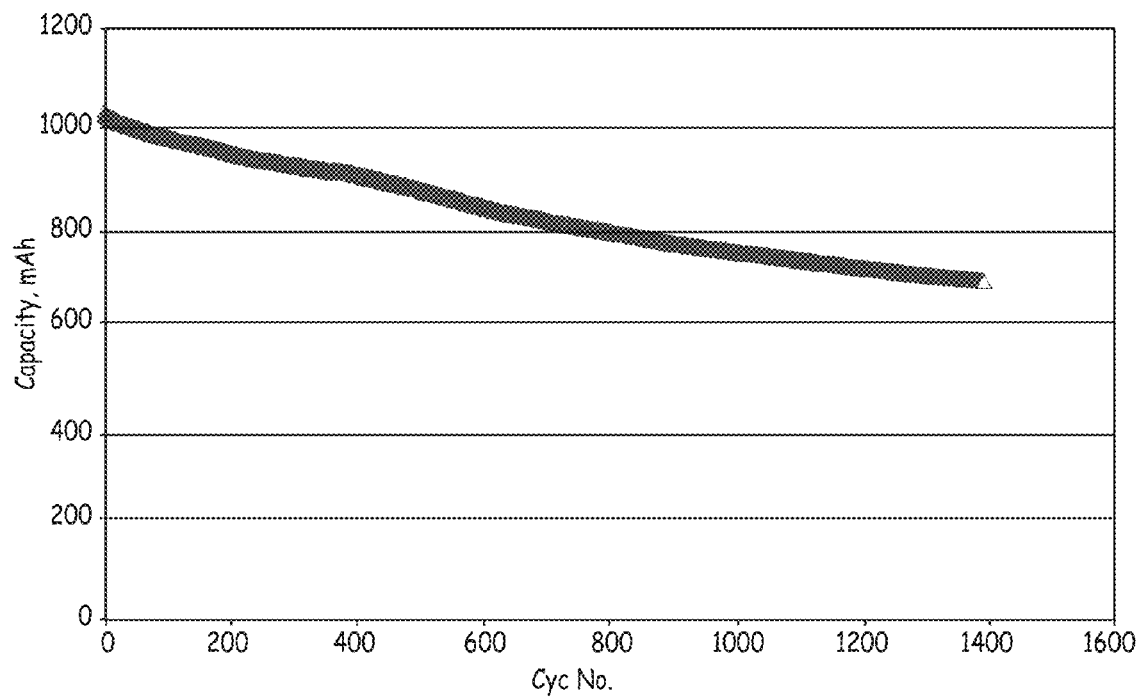
FIG. 7 is a plot showing capacity retention of battery 2b from Example 1 cycled at accelerated charge/discharge rate and elevated temperature.

To test the performance of the 1 Ah battery 2b at accelerated charge/discharge rates at elevated temperature, pouch cell battery 2b from example 1 was cycled for 1400 cycles at 1 C charge and 1 C discharge rates between 4.35 V to 2.2 V at 45° C. As shown in the FIG. 7, after cycling at accelerated charge/discharge rates for over 1000 cycles, the capacity of the battery 2b maintained above 650 mAh.

Example 4

DC Resistance of the Batteries

DC-Resistance (DCR) of single layer pouch batteries 1a and 2a were measured following the protocol below. Prior to measuring the DCR, the batteries are activated to 4.6V as described above.

Specifically, DC resistance (DCR) protocols comprises the following steps:

Step a: The batteries are charged at C/3 rate to a voltage of 4.5V. The batteries are then discharged corresponding to 10% of the capacity.

Step b: A rest period of 5 minutes is applied and then the batteries are discharge for 10 sec using a pulse current of 1 C rate. A rest of 40 seconds is applied and then the batteries are charged for 10 sec using a pulse current of 1 C.

Step c: The batteries are then discharged corresponding to 10% and step b is repeated.

This is done 9 times and hence at different states of charge (SOC) (90% to 10% state of charge).

Figure 8A:
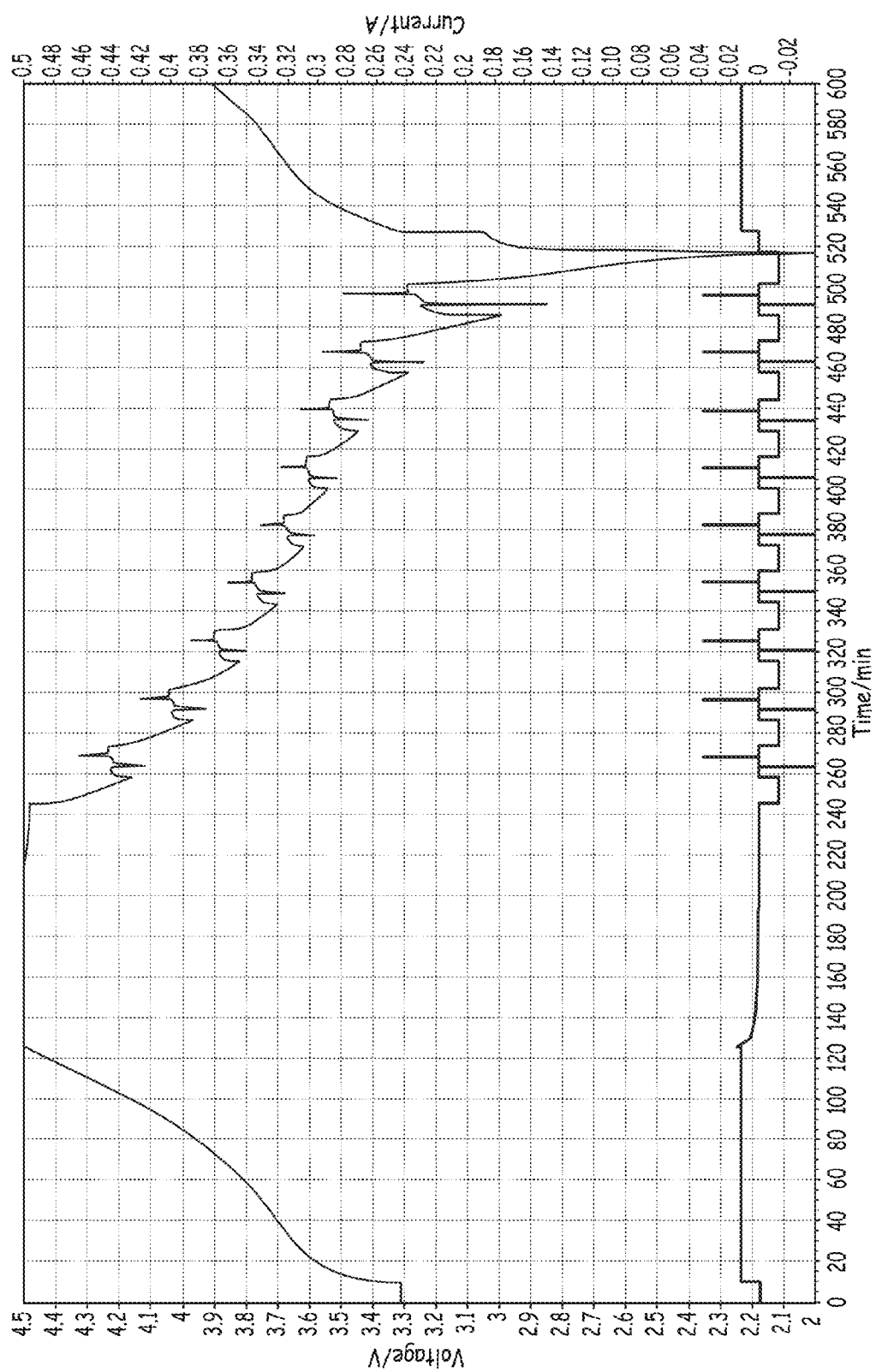
Figure 8B:
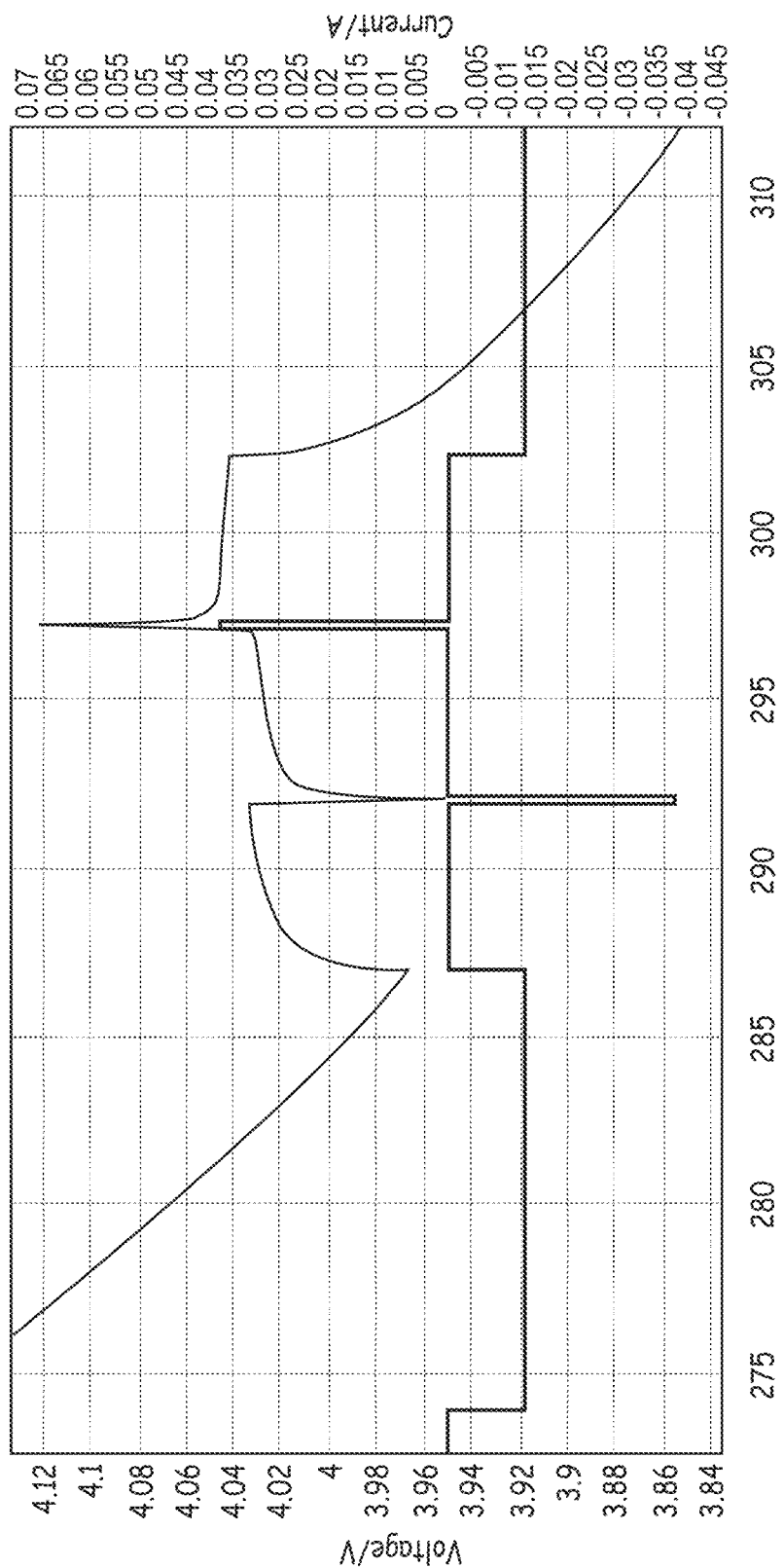
FIG. 8B is an enlarged portion of FIG. 8A showing current flow and a portion of the voltage curve over one pulse cycle.

FIG. 8A shows a typical DCR protocol used to obtain DCR measurements of the batteries, with an enlarged portion in FIG. 8B showing current flow and a portion of the voltage curve over one pulse cycle.

Figure 9:
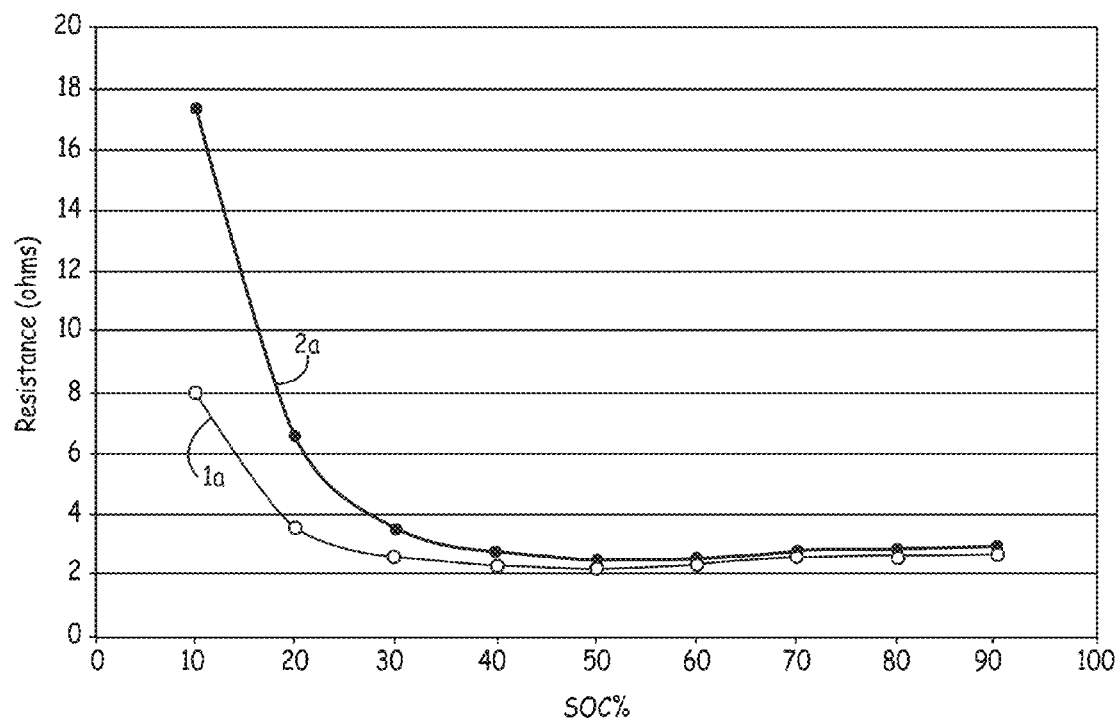
FIG. 9 is a plot showing the DCR of batteries 1a and 2a between 10 to 90% states of charge (SOC).

The DC resistance of batteries 1a and 2a were measured between 10% and 90% SOC and the results are shown in FIG. 9. Both batteries show steady DCR between 20% and 90%, with battery 1a showing particularly low SOC of less than 6 ohms even at 20% SOC. What is particularly notable is the flatness of the DC resistance curves between 90% state of charge and 20% and essentially to 10% state of charge for composition 1. While the absolute values of the resistance is not particularly low for this battery design, the flatness of the resistance over the state of charge is very significant and reflects relatively good electrical conductivity of the positive electrode active material. The DCR of the batteries 1a and 2a between 20% and 90% SOC were outlined in Table 3 together with C/10 discharge capacity of batteries 1 and 2.

TABLE 3

| Battery | C/10 Discharge Capacity (mAh/gm) | Battery | DC Resistance (ohm) between 20% and 90% SOC |
|---|---|---|---|
| 1 | 212 | 1a | <3 |
| 2 | 230 | 2a | <7 |

As shown in Table 3, both batteries 1a and 2a showed low DCR between 20% and 90% SOC.

Figure 10:
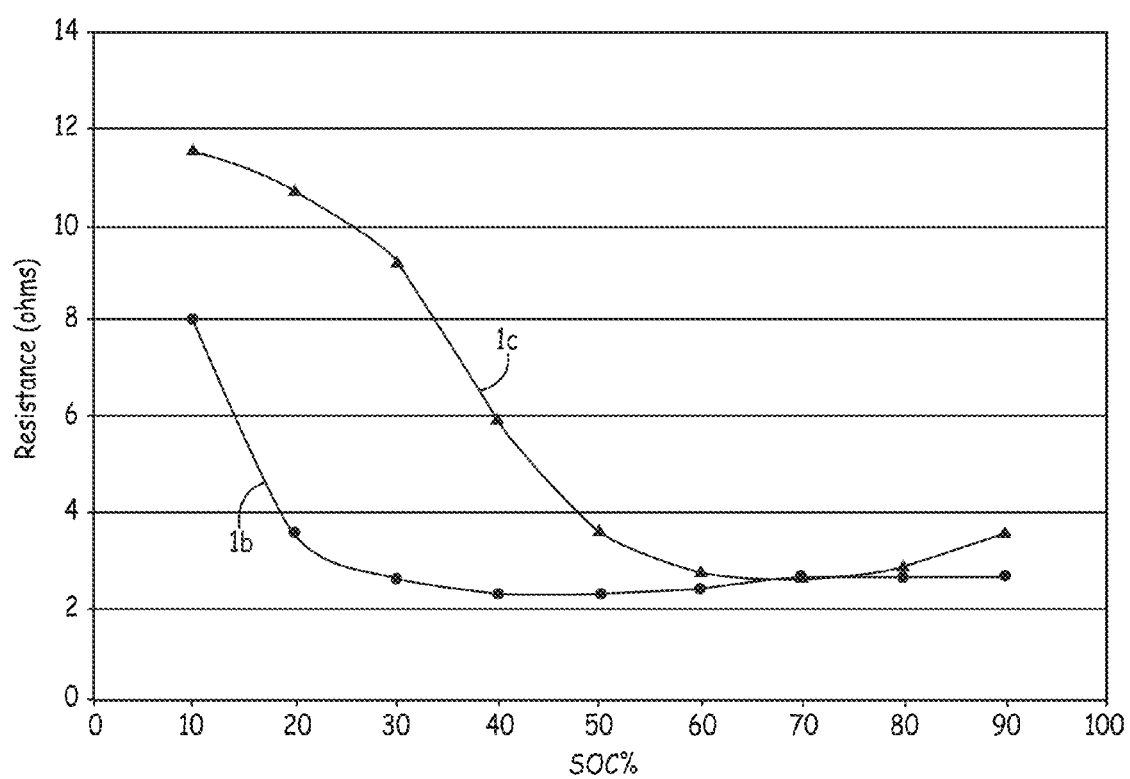
FIG. 10 is a plot showing DCR of batteries 1b and 1c between 10 to 90% states of charge (SOC).

Two single layer pouch cell batteries 1b and 1c were constructed following the procedure outlined above with high power HCMR positive electrode material and lithium rich cathode with X=0.5 respectively and graphitic carbon counter electrode. The X=0.5 material was studied in detail in the '332 application cited above. The DC resistance of batteries 1b and 1c were measured between 10% to 90% SOC and the results are plotted in FIG. 10. As shown in FIG. 10, Lithium rich layered-layered cathode material shows a rapid rise in resistance at roughly 50% SOC which means that the power would be severely compromised below 50% SOC. However, with Envia high power materials it is possible to operate the battery at least to 20% SOC without compromising any power.

Example 5

High Capacity Pouch Cell Batteries

HCMR™ cathode material having the general formula of composition 1 from Example 1 were used to construct pouch cell batteries 1d and 1e designed with roughly 27 Ah and 40 Ah capacities respectively using the procedure outlined above. Cathodes with same specifications were used in both batteries 1d and 1e. The specifications of the batteries are listed in Table 4 below. Pouch cell batteries 1d and 1e were activated to 4.35V using the multiple step partial activation formation protocol described in above.

TABLE 4

| | Battery 1d | Battery 1e |
|---|---|---|
| Cell Type | Prismatic Polymer | Prismatic Polymer |
| Thickness (mm) | 8 | 10 |
| Dimension (mm × mm) | 165 × 249 | 165 × 249 |
| Capacity (Ah) | 27 | 40 |
| Nominal Voltage (V) | 3.74 | 3.74 V |
| Specific Energy (Wh/kg @ C/3) | 190 | 219 |
| Volumetric Energy Density (Wh/l @ C/3) | 324 | 369 |
| Weight (kg) | 0.562 | 0.693 |

Figure 11A:
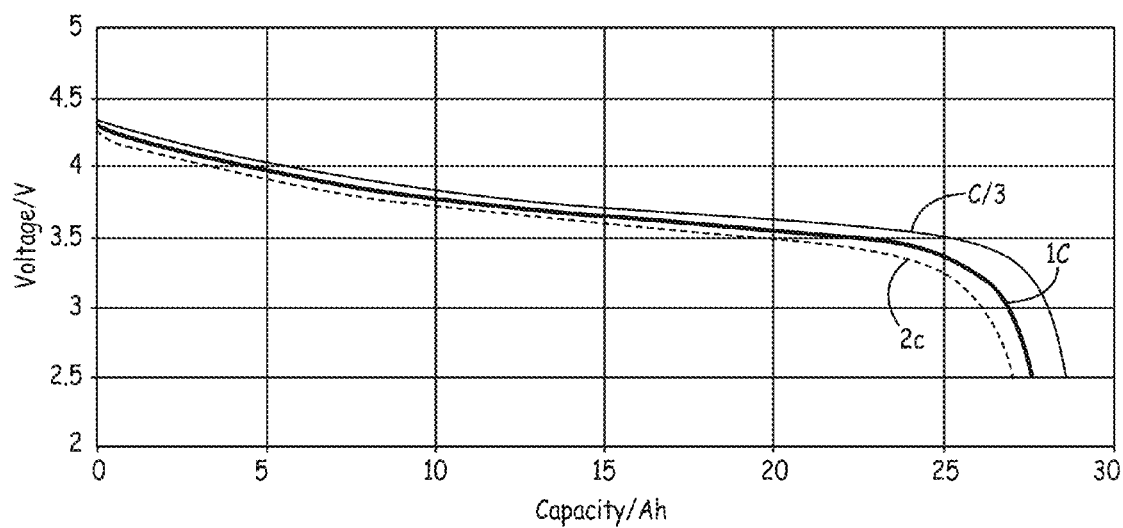
FIG. 11A is a plot showing the voltage versus capacity of pouch cell battery 1d cycled at C/3, 1 C, and 2 C.
Figure 11B:
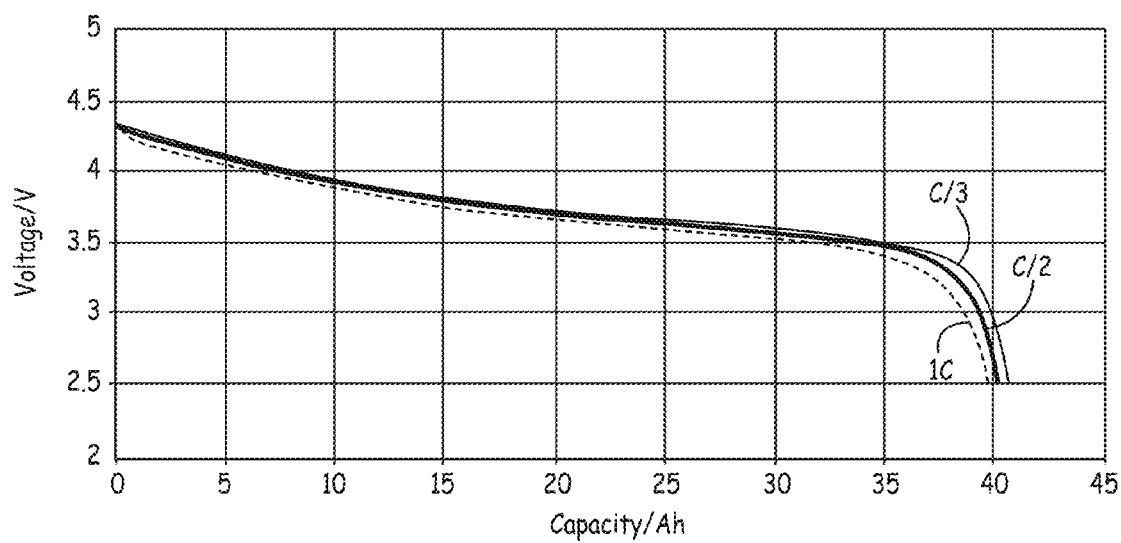
FIG. 11B is a plot showing the voltage versus capacity of pouch cell battery 1e cycled at C/3, C/2, and 1 C.

The voltage versus capacity performance from 4.35V to 2.5V at different discharge rates of batteries 1d and 1e were measured and the results are plotted in FIGS. 11A and 11B respectively. Corresponding energy density of the batteries at discharge rates 2 C, 1 C, C/2, and C/3 between 4.35 and 2.5 V were calculated and listed in Table 5 below.

TABLE 5

| | Battery 1d Energy (Wh/kg) | Battery 1e Energy (Wh/kg) |
|---|---|---|
| C/3 | 190 | 219 |
| C/2 | N/A | 216 |
| 1C | 181 | 210 |
| 2C | 175 | N/A |

Figure 12A:
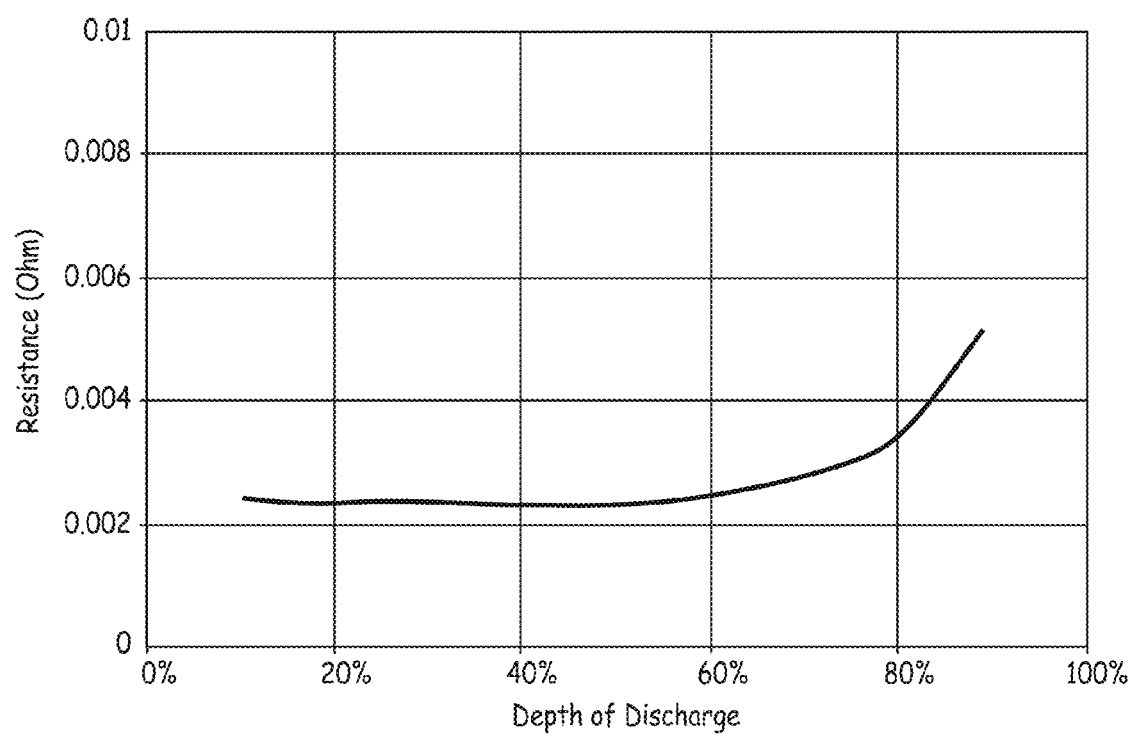
FIG. 12A is a plot showing the resistance versus depth of discharge of pouch cell battery 1d cycled at 5 C discharge and 3.75 charge at 20 degree C. between 4.35 V and 2.5V.
Figure 12B:
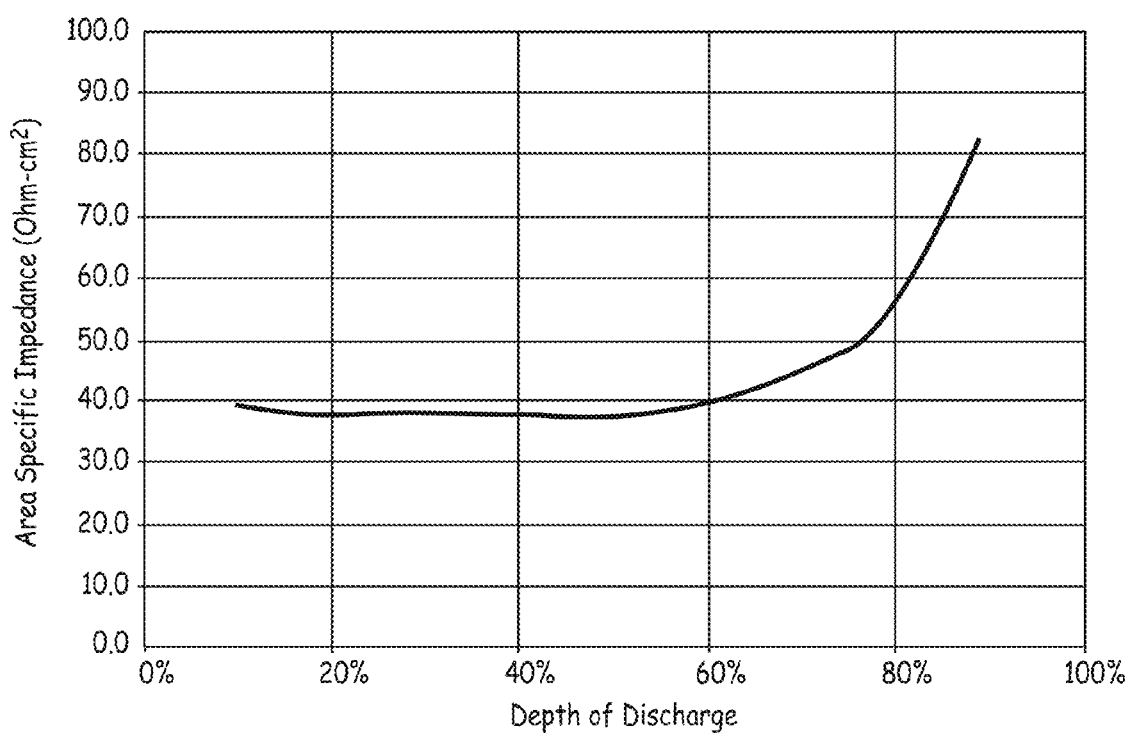
FIG. 12B is a plot showing the area specific impedance versus depth of discharge of pouch cell battery 1d cycled at 5 C discharge and 3.75 charge at 20 degree C. between 4.35 V and 2.5V.

After the activation or formation, battery 1d was tested for DC resistance using the protocol described above except with a 5 C discharge pulse and 3.75 charge pulse at 20 degree C. with 4.35V corresponding to 100% SOC. Resistance of the battery 1d between 10% and 90% depth of discharge were measured and the resistance and area specific impedance versus depth of discharge of the battery 1d were plotted in FIG. 12A and FIG. 12B respectively.

Figure 12C:
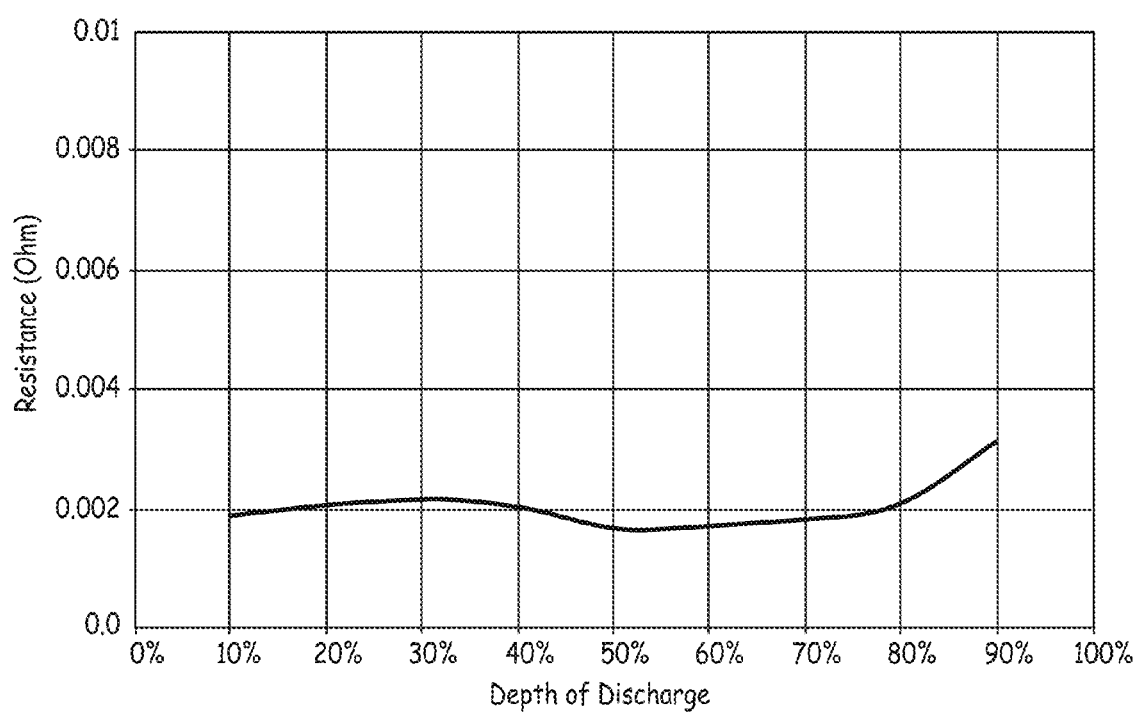
FIG. 12C is a plot showing the resistance versus depth of discharge of pouch cell battery 1e cycled at 1 C discharge and 0.75 charge at 30 degree C. between 4.35 V and 2.2V.
Figure 12D:
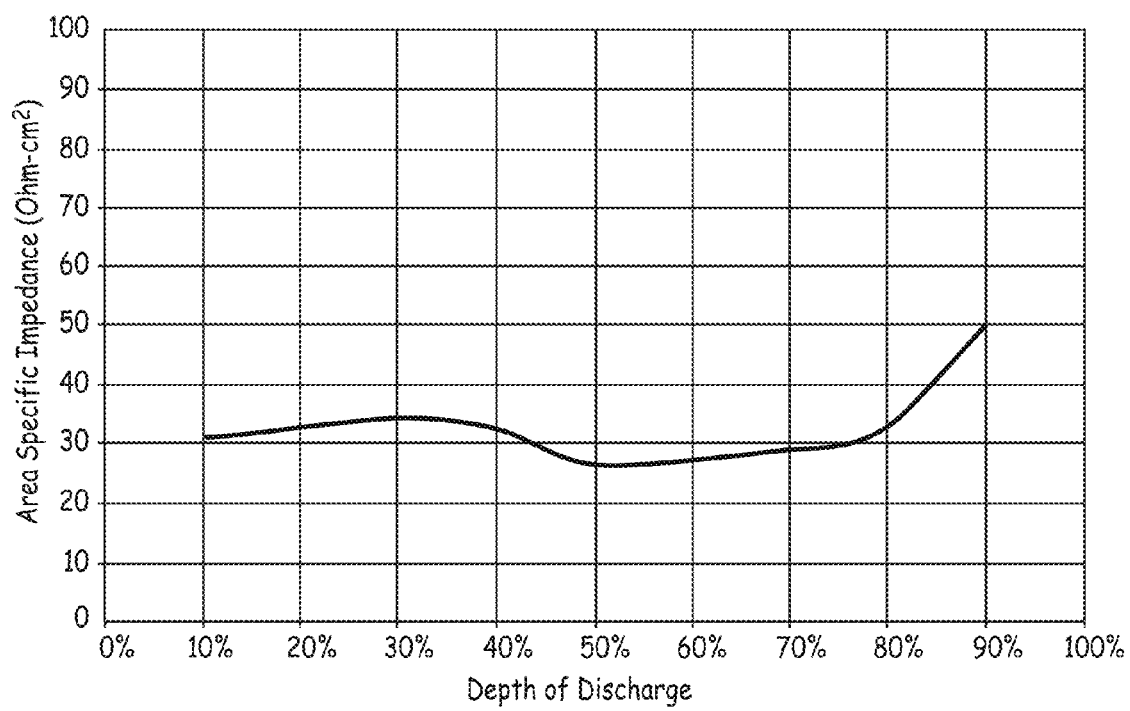
FIG. 12D is a plot showing the area specific impedance versus depth of discharge of pouch cell battery 1e cycled at 1 C discharge and 0.75 charge at 30 degree C. between 4.35 V and 2.2V.

After the activation or formation, the battery was for DC resistance using the protocol described above at 1 C discharge pulse rate and 0.75 charge pulse rate at 30 degree C. with 4.35V corresponding to 100% SOC. Resistance of the battery 1e between 10% and 90% depth of discharge were measured and the resistance and area specific impedance versus depth of discharge of the battery 1e were plotted in FIG. 12C and FIG. 12D respectively.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A secondary lithium ion battery comprising a carbon based negative electrode, a positive electrode comprising $Li_{1+b}Ni_\alpha Mn_\beta Co_\gamma A_\delta O_2$ with $0.065 \leq b \leq 0.0895$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant, a separator between the negative electrode and the positive electrode and an electrolyte comprising lithium ions, the positive electrode having an active material density from about 2 g/mL to about 4 g/mL and a total thickness from about 45 microns to about 200 microns and having a specific capacity of at least about 205 mAh/g cycled against lithium from 4.6V to 2V at a rate of C/10 at room temperature based on the weight of the positive electrode active material, and wherein the battery has a room temperature DC resistance of no more than about 80 ohms-cm$^2$ at 20% SOC based on a full charge to 4.35V.

2. The secondary lithium ion battery of claim 1 having a room temperature DC resistance that does not change by more than a factor of 5 between the lowest value and the largest value over a range of state of charge from 10% to 90% with a full charge voltage of 4.35V.

3. The lithium ion secondary battery of claim 1 having a room temperature DC resistance that does not change by more than a factor of 4 between the lowest value and the largest value over a range of state of charge from 10% to 90% with a full charge voltage of 4.35V.

4. The lithium ion secondary battery of claim 1 wherein A is Mg, Sr, Ba, Cd, Zn, Al, Ga, B, Zr, Ti, Ca, Ce, Y, Nb, Cr, Fe, V, or combinations thereof and $0.065 \leq b \leq 0.0895$, and wherein the battery has a room temperature areas specific DC resistance is no more than about 75 ohms-cm$^2$ at 20% SOC based on a full charge to 4.35V.

5. The lithium ion secondary battery of claim 1 wherein the battery exhibits an energy density of at least about 180 Wh/kg at a rate of C/3 from 4.35V to 2V at room temperature.

6. The lithium ion secondary battery of claim 1 wherein the battery is a pouch battery comprising a pouch cell enclosure enclosing the electrodes, electrolyte and separator with electrically conductive tabs extending from the enclosure with respective electrical connections with the current collectors.

7. A secondary lithium ion battery comprising a carbon based negative electrode, a positive electrode comprising $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant, a separator between the negative electrode and the positive electrode and an electrolyte comprising lithium ions, the positive electrode having an active material density from about 2 g/mL to about 4 g/mL and a total thickness from about 45 microns to about 200 microns and having a specific capacity of at least about 205 mAh/g cycled against lithium from 4.6V to 2V at a rate of C/10 at room temperature based on the weight of the positive electrode active material, wherein the battery has a room temperature DC resistance that does not change by more than a factor of 5 between the lowest value and the largest value over a range of state of charge from 10% to 90% with a frill charge voltage of 4.35V and wherein the battery has a room temperature discharge specific energy of at least about 185 Wh/kg at a discharge rate of C/3 from 4.35V to 2V.

8. A secondary lithium ion battery comprising a positive electrode comprising a high specific capacity lithium rich metal oxide, a negative electrode comprising graphitic carbon, a separator between the positive electrode and the negative electrode, current collectors respectively associated with the positive electrode and the negative electrode, electrolyte comprising lithium ions dissolved in a nonaqueous solvent, and a pouch cell enclosure enclosing the electrodes, electrolyte and separator with electrically conductive tabs extending from the enclosure with respective electrical connections with the current collectors,
wherein the high specific capacity lithium rich metal oxide is approximately represented by the formula $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant, and
wherein the battery has a room temperature discharge specific energy of at least about 185 Wh/kg at a discharge rate of C/3 from 4.35V to 2V and wherein the battery capacity decreases by no more than about 20% from the 5$^{th}$ cycle to the 1000$^{th}$ cycle when cycled at room temperature from 4.24V to 2.73V at a rate of C/3.

9. The secondary lithium ion battery of claim 8 wherein the average voltage of the battery decreases by no more than about 8% from the 5$^{th}$ cycle to the 1000$^{th}$ cycle when cycled at room temperature from 4.24V to 2.73V at a rate of C/3.

10. The secondary lithium ion battery of claim 8 wherein the battery capacity decreases by no more than about 15% from the 5$^{th}$ cycle to the 1000$^{th}$ cycle when cycled at room temperature from 4.24V to 2.73V at a rate of C/3.

11. The secondary lithium ion battery of claim 8 wherein a room temperature DC electrical resistance does not change by more than a factor of 5 between the lowest value and the highest value over a range of state of charge from 10% to 90% with a full charge voltage of 4.35V.

12. The secondary lithium ion battery of claim 8 wherein $0.065 \leq b \leq 0.0895$.

13. The secondary lithium ion battery of claim 8 wherein $0.23 \leq \alpha \leq 0.34$, $0.36 \leq \beta 0.445$, $0.15 \leq \gamma \leq 0.29$, and wherein A is Mg, Sr, Ba, Cd, Zn, Al, Ga, B, Zr, Ti, Ca, Ce, Y, Nb, Cr, Fe, V, or combinations thereof.

14. The secondary lithium ion battery of claim 8 wherein A is magnesium and $0.01 \leq \delta \leq 0.0375$.

15. The secondary lithium ion battery of claim 8 wherein $b+\alpha+\beta+\gamma+\delta$ is approximately equal to 1.

16. The secondary lithium ion battery of claim 8 wherein the negative electrode comprises graphitic carbon.

17. The secondary lithium ion battery of claim 8 wherein a room temperature DC resistance is no more than about 4 milli-ohms at 20% SOC based on a full charge to 4.35V.

18. The secondary lithium ion battery of claim 8 wherein the electrolyte comprises ethylene carbonate, dimethyl carbonate and methyl ethyl carbonate.

19. The secondary lithium ion battery of claim 8 wherein the battery is a pouch battery having a discharge capacity of at least about 5 Ah discharged at a rate of C/10 from about 4.5V to about 1.5V.

20. The secondary lithium ion battery of claim 19 having a total of at least 5 positive electrode structures and at least one negative electrode structure for each positive electrode structure, each positive electrode structure and negative electrode structure comprising a metal current collector, wherein each positive electrode has an active material density from about 2 g/mL to about 4 g/mL and a total thickness from about 45 microns to about 200 microns and negative electrodes stacked between positive electrodes have an active material density 1.25 g/mL to about 2 g/mL and a total thickness form about 25 microns to about 200 microns.

21. The secondary lithium ion battery of claim 8 having a room temperature DC resistance that does not change by more than a factor of 4 between the lowest value and the largest value over a range of state of charge from 10% to 90% with a full charge voltage of 4.35V.

22. The secondary lithium battery of claim 8 wherein the positive electrode further comprises a non-active inorganic coating on the high specific capacity lithium rich metal oxide, wherein the coating comprises a metal halide or a metal oxide.

23. A lithium-based battery active material comprising a lithium rich metal oxide approximately represented by the formula $Li_{1+b}Ni_\alpha Mn_\beta Co_\gamma A_\delta O_2$ with $0.065 \leq b \leq 0.0895$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant, wherein the material has a specific discharge capacity of at least about 200 mAh/g cycled against lithium from 4.6V to 2V at a rate of C/10 at room temperature based on the weight of the positive electrode active material discharged against lithium.

24. The lithium-based battery active material of claim 23 wherein $0.072 \leq b \leq 0.08$.

25. The lithium-based battery active material of claim 23 wherein $0.072 \leq b \leq 0.089$.

26. The lithium-based battery active material of claim 23 wherein $0.23 \leq \alpha \leq 0.34$, $0.36 \leq \beta \leq 0.445$, $0.15 \leq \gamma \leq 0.29$, $0 \leq \delta \leq 0.04$, and wherein A is Mg, Sr, Ba, Cd, Zn, Al, Ga, B, Zr, Ti, Ca, Ce, Y, Nb, Cr, Fe, V, or combinations thereof.

27. The lithium-based battery active material of claim 23 wherein $0.24 \leq \alpha \leq 0.33$, $0.38 \leq \beta \leq 0.4425$, $0.15 \leq \gamma \leq 0.275$, $0 \leq \delta \leq 0.0375$, and wherein A is Mg, Sr, Ba, Cd, Zn, Al, Ga, B, Zr, Ti, Ca, Ce, Y, Nb, Cr, Fe, V, or combinations thereof.

28. The lithium-based battery active material of claim 23 further comprising a non-active inorganic coating.

29. The lithium-based battery active material of claim 28 wherein the coating comprises a metal halide or a metal oxide.

30. The lithium-based battery active material of claim 23 wherein $b+\alpha+\beta+\gamma+\delta$ is approximately equal to 1.

31. A secondary lithium ion battery comprising a positive electrode comprising a high specific capacity lithium rich metal oxide, a negative electrode comprising graphitic carbon, a separator between the positive electrode and the negative electrode, current collectors respectively associated with the positive electrode and the negative electrode, electrolyte comprising lithium ions dissolved in a nonaqueous solvent, and a pouch cell enclosure enclosing the electrodes, electrolyte and separator with electrically conductive tabs extending from the enclosure with respective electrical connections with the current collectors, wherein the high specific capacity lithium rich metal oxide is approximately represented by the formula $Li_{1+b}Ni_\alpha Mn_\beta Co_\gamma A_\delta O_2$ with $0.05 \leq b \leq 0.125$, $0.225 \leq \alpha \leq 0.35$, $0.35 \leq \beta \leq 0.45$, $0.15 \leq \gamma \leq 0.3$, $0 \leq \delta \leq 0.05$, where A is a metal different from lithium, nickel, manganese and cobalt, and up to five mole percent of the oxygen can be replaced with a fluorine dopant, and wherein the battery has a room temperature discharge specific energy of at least about 160 Wh/kg at a discharge rate of C/3 from 4.35V to 2V and wherein the battery capacity decreases by no more than about 35% from the $5^{th}$ cycle to the $5000^{th}$ cycle when cycled at room temperature from 4.24V to 2.73V at a rate of C/3.

32. The secondary lithium battery of claim 31 wherein the positive electrode further comprises a non-active inorganic coating on the high specific capacity lithium rich metal oxide, wherein the coating comprises a metal halide or a metal oxide.

* * * * *